(12) United States Patent
Kim

(10) Patent No.: US 9,500,375 B2
(45) Date of Patent: Nov. 22, 2016

(54) HEAT PUMP AND METHOD FOR CONTROLLING THE SAME

(75) Inventor: Sung Goo Kim, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1004 days.

(21) Appl. No.: 13/485,310

(22) Filed: May 31, 2012

(65) Prior Publication Data

US 2012/0324923 A1     Dec. 27, 2012

(30) Foreign Application Priority Data

Jun. 23, 2011    (KR) ........................ 10-2011-0061000

(51) Int. Cl.
| | |
|---|---|
| F24D 3/18 | (2006.01) |
| F24D 5/12 | (2006.01) |
| F24D 19/10 | (2006.01) |
| F24F 3/06 | (2006.01) |
| F24H 4/02 | (2006.01) |
| F24D 17/02 | (2006.01) |
| F24D 3/12 | (2006.01) |

(52) U.S. Cl.
CPC . *F24D 3/18* (2013.01); *F24D 5/12* (2013.01); *F24D 19/1039* (2013.01); *F24D 19/1087* (2013.01); *F24F 3/06* (2013.01); *F24D 3/12* (2013.01); *F24D 17/02* (2013.01); *F24F 2221/54* (2013.01); *F24H 4/02* (2013.01)

(58) Field of Classification Search
CPC ...... F24D 3/18; F24D 17/02; F24D 19/1039; F24F 5/00; F24H 4/00; F24H 4/02; F24H 4/04
USPC ........ 62/159, 160, 180, 238.6, 238.7, 324.1, 62/324.6, 325
See application file for complete search history.

(56) References Cited

U.S. PATENT DOCUMENTS

| | | | | |
|---|---|---|---|---|
| 4,592,206 A | * | 6/1986 | Yamazaki et al. | ............... 62/160 |
| 4,943,003 A | * | 7/1990 | Shimizu | .................... F24D 5/12 |
| | | | | 165/11.1 |
| 5,088,646 A | * | 2/1992 | Yamagishi | .............. F24D 15/04 |
| | | | | 237/2 B |
| 6,116,047 A | * | 9/2000 | Inoue | ........................ F24H 4/02 |
| | | | | 62/238.3 |

(Continued)

FOREIGN PATENT DOCUMENTS

| | | |
|---|---|---|
| KR | 10-2010-0047476 | 5/2010 |
| KR | 10-1013377 | 1/2011 |

OTHER PUBLICATIONS

Korean Notice of Allowance dated Mar. 18, 2015 in corresponding Korean Patent Application No. 10-2011-0061000.

*Primary Examiner* — Jonathan Bradford
(74) *Attorney, Agent, or Firm* — Staas & Halsey LLP

(57) ABSTRACT

A method for controlling a heat pump including an outdoor unit including a compressor and a first heat exchanger, an indoor unit including a second heat exchanger and an expansion valve to perform air stream cooling and heating operations, and a hydro unit connected among the compressor, the first heat exchanger, and the expansion valve, to change a flow direction of refrigerant in accordance with cold water and hot water operations. In the control method, it is determined whether the hot water operation and the air stream heating operation are simultaneously selected. When the hot water operation and the air stream heating operation are simultaneously selected, an opening degree of a valve included in the hydro unit is adjusted, to adjust amounts of refrigerant respectively supplied from the compressor to the hydro unit and the indoor unit.

11 Claims, 17 Drawing Sheets

(56) References Cited

U.S. PATENT DOCUMENTS

| | | | |
|---|---|---|---|
| 7,152,413 B1* | 12/2006 | Anderson | F24F 5/0017 62/118 |
| 2006/0218948 A1* | 10/2006 | Otake et al. | 62/160 |
| 2010/0282434 A1* | 11/2010 | Yabuuchi et al. | 165/63 |
| 2011/0214437 A1* | 9/2011 | Jeong et al. | 62/79 |
| 2011/0259025 A1* | 10/2011 | Noh et al. | 62/160 |
| 2011/0259027 A1* | 10/2011 | Choi et al. | 62/196.1 |
| 2011/0283725 A1* | 11/2011 | Sim | 62/151 |
| 2011/0283726 A1* | 11/2011 | Sim | 62/160 |
| 2011/0289952 A1* | 12/2011 | Kim et al. | 62/189 |
| 2011/0302948 A1* | 12/2011 | Honda | F24D 3/08 62/324.6 |
| 2011/0315091 A1* | 12/2011 | Adachi | F24D 17/0031 122/14.1 |
| 2012/0042673 A1* | 2/2012 | Noh et al. | 62/159 |
| 2012/0042678 A1* | 2/2012 | Park et al. | 62/324.1 |
| 2012/0043390 A1* | 2/2012 | Noh et al. | 237/2 A |
| 2012/0060538 A1* | 3/2012 | Saito | F24H 4/02 62/324.1 |
| 2012/0111032 A1* | 5/2012 | Woo | F24D 17/02 62/79 |

* cited by examiner

HEAT PUMP AND METHOD FOR CONTROLLING THE SAME

CROSS-REFERENCE TO RELATED APPLICATIONS

This application claims the benefit of Korean Patent Application No. 10-2011-0061000 filed on Jun. 23, 2011 in the Korean Intellectual Property Office, the disclosure of which is incorporated herein by reference.

BACKGROUND

1. Field

Embodiments of the present disclosure relate to a heat pump and a method for controlling the same.

2. Description of the Related Art

Heat pumps are Used as a cooling/heating apparatus to transfer low-temperature heat to a high-temperature side or to transfer high-temperature heat to a low-temperature side, using heat of evaporation of refrigerant or heat of condensation of refrigerant. Such heat pumps are classified into an electric heat pump (EHP) and a gas heat pump (GHP) in accordance with the driving mechanism thereof or are classified into a water source heat pump (waste source heat pump) and a ground source heat pump (GSHP) in accordance with the type of heat source thereof. Also, heat pumps are classified into a hot air heat pump, a cold air heat pump, a hot water heat pump, and cold water heat pump in accordance with the type of heat supply thereof or are classified into a heating heat pump, a cooling heat pump, a dehumidifying heat pump, and a cooling/heating heat pump in accordance with the purpose thereof.

Such a heat pump includes a first heat exchanger, a second heat exchanger, a compressor, a 4-way valve, an expansion valve, an outdoor fan, and an indoor fan. When the heat pump operates in a heating mode, high-temperature and high-pressure refrigerant emerging from the compressor is fed to the second heat exchanger which, in turn, discharges high-temperature heat of the refrigerant to an outside thereof, which is at low temperature. Thus, heating is carried out. On the other hand, when the heat pump operates in a cooling mode, heat is transferred from a low-temperature side to a high-temperature side, using latent heat of evaporation of refrigerant generated in accordance with phase variation through vaporization and liquifying of the refrigerant. Thus, cooling is carried out.

The above-mentioned heat pump is configured to absorb or discharge heat through air streams, which perform heat exchange around the heat exchangers using the fans, namely, in an air stream manner.

However, such a heat pump may have degraded applicability for general purposes in that it does not have a hot water supply function, even though it has a cooling or heating function for a room. To this end, a heat pump capable of supplying hot water has been developed.

The heat pump, which is capable of supplying hot water, may generate hot water through a water-refrigerant heat exchanger, to externally supply the generated hot water or to use the hot water as heating water.

When the hot water is used as heating water, it is supplied to various heating appliances such as a floor heater, a fan coil, and a radiator to heat a desired area.

That is, the above-mentioned heat pump not only performs air stream cooling or heating by lowering or raising the temperature of room air, but also performs cooling or heating using cold water or hot water generated by lowering or raising the temperature of water.

However, when the heat pump performs air stream heating using an air stream indoor system, stratification of indoor air may occur. As a result, the user may feel uncomfortable due to hot air generated during heating operation, and may prematurely feel a chill after the heating operation is stopped.

That is, such a heat pump may have a problem in that the efficiency of sensible heat is low.

When the heat pump performs radiant heating such as floor heating, using hot water, it exhibits superior effects in sensible heat because the radiant heating is carried out in the same manner as a boiler. In this case, however, there may be a problem in that a lot of time is taken until floor heating is achieved.

SUMMARY

Therefore, it is an aspect of the present disclosure to provide a heat pump and a control method thereof, which are capable of simultaneously achieving air stream heating and radiant heating or simultaneously achieving air stream cooling and hot water supply by performing one of the air stream cooling/heating operation through air heat exchange, cold water/hot water operation through water heat exchange, and hybrid operation (air stream cooling/heating and cold water/hot water operation).

Another aspect of the present disclosure is to provide a heat pump and a control method thereof, which are capable of simultaneously achieving air stream heating and cold water operation or simultaneously achieving air stream cooling and cold water supply.

Another aspect of the present disclosure is to provide a heat pump and a control method thereof, which are capable of achieving air stream heating and cold water operation with a maximum capacity or less by controlling the opening degree of a flow rate control valve provided at a hydro unit.

Another aspect of the present disclosure is to provide a heat pump and a control method thereof, which are capable of maintaining a desired temperature of hot water during air stream heating and hot water operation by controlling the opening degree of a flow rate control valve provided at an outdoor unit.

Another aspect of the present disclosure is to provide a heat pump and a control method thereof, which are capable of controlling overheating during air stream heating and cold water operation by controlling the opening degree of an expansion valve provided at an outdoor unit.

Another aspect of the present disclosure is to provide a heat pump and a control method thereof, which are capable of achieving air stream cooling and cold water operation with a maximum capacity or less by controlling the opening degree of an expansion valve provided at a hydro unit.

Additional aspects of the disclosure will be set forth in part in the description which follows and, in part, will be apparent from the description, or may be learned by practice of the disclosure.

In accordance with one aspect of the present disclosure, a method for controlling a heat pump including an outdoor unit including a compressor and a first heat exchanger, an indoor unit including a second heat exchanger and an expansion valve to perform air stream cooling and heating operations, and a hydro unit connected among the compressor, the first heat exchanger, and the expansion valve, to change a flow direction of refrigerant in accordance with cold water and hot water operations, includes determining whether the hot water operation and the air stream heating operation are simultaneously selected, and adjusting an opening degree of a valve included in the hydro unit when the hot water operation and the air stream heating operation are simultaneously selected, to adjust amounts of refrigerant respectively supplied from the compressor to the hydro unit and the indoor unit.

The adjusting the opening degree of the valve included in the hydro unit may include identifying a capacity of the indoor unit, selecting an opening degree of the valve such that the selected opening degree corresponds to the identified capacity of the indoor unit, and adjusting the opening degree of the valve such that the adjusted opening degree corresponds to the selected opening degree.

The method may further include detecting an outdoor temperature, and compensating the selected opening degree, based on the detected outdoor temperature.

The method may further include detecting an indoor temperature, identifying a target temperature of the indoor unit, calculating a difference between the indoor unit and the target temperature, and compensating the capacity of the indoor unit, based on the calculated temperature difference.

The adjusting the opening degree of the valve included in the hydro unit may include reducing the opening degree of the valve for a higher capacity of the indoor unit.

The method may further include determining whether a cold air discharge condition to discharge cold air through the indoor unit is satisfied, and adjusting the opening degree of the valve such that the adjusted opening degree corresponds to a minimum opening degree when the cold air discharge condition is satisfied.

The determining whether the cold air discharge condition is satisfied may include detecting a pressure of a high pressure section of the outdoor unit, and determining that the cold air discharge condition is satisfied, when the detected pressure is lower than a predetermined high temperature.

The determining whether the cold air discharge condition is satisfied may include detecting a temperature of water discharged from the hydro unit, and determining that the cold air discharge condition is satisfied, when the temperature of the discharge water is lower than a predetermined temperature.

The method may further include adjusting the opening degree of the valve included in the hydro unit such that the adjusted opening degree corresponds to a maximum opening degree, when it is determined that only the hot water operation is selected, to cut off the supply of refrigerant to the indoor unit.

The method may further include determining whether the air stream cooling operation and the cold water operation are simultaneously selected, and adjusting the opening degree of the valve included in the hydro unit when the air stream cooling operation and the cold water operation are simultaneously selected, to control a low pressure of an inlet side of the compressor.

The method may further include opening a first electromagnetic valve provided between an outlet side of the compressor and the hydro unit when the hot water operation is selected, opening a second electromagnetic valve provided between the inlet side of the compressor and the hydro unit when the cold water operation is selected, and opening a third electromagnetic valve provided between the compressor and the indoor unit when one of the air stream cooling and heating operations is selected.

The method may further include controlling a valve included in the outdoor unit when the hot water operation and the air stream heating operation are simultaneously selected, to lower a pressure of refrigerant supplied to the first heat exchanger.

In accordance with another aspect of the present disclosure, a method for controlling a heat pump including an outdoor unit including a compressor and a first heat exchanger, an indoor unit including a second heat exchanger and an expansion valve to perform air stream cooling and heating operations, and a hydro unit connected among the compressor, the first heat exchanger, and the expansion valve, to change a flow direction of refrigerant in accordance with cold water and hot water operations, includes determining whether the hot water operation and the air stream heating operation are simultaneously selected, and adjusting an opening degree of a valve included in the outdoor unit when the hot water operation and the air stream heating operation are simultaneously selected, to adjust amounts of refrigerant respectively supplied from the indoor unit to the hydro unit and the first heat exchanger of the outdoor unit.

The method may further include adjusting the opening degree of the valve included in the outdoor unit such that the adjusted opening degree corresponds to a maximum opening degree, when it is determined that only the air stream cooling operation is selected, to cut off the supply of refrigerant to the hydro unit.

The adjusting the opening degree of the valve included in the outdoor unit may include detecting a temperature of water introduced into the hydro unit, comparing the detected introduced water with a predetermined introduced water temperature, to calculate a difference between the compared temperatures, selecting an opening degree corresponding to the temperature difference, and adjusting the opening degree of the valve included in the outdoor unit such that the adjusted opening degree corresponds to the selected opening degree.

The adjusting the opening degree of the valve included in the outdoor unit may include detecting a temperature of water discharged from the hydro unit, comparing the detected discharge water with a predetermined discharge water temperature, to calculate a difference between the compared temperatures, selecting an opening degree corresponding to the temperature difference, and adjusting the opening degree of the valve included in the outdoor unit such that the adjusted opening degree corresponds to the selected opening degree.

The adjusting the opening degree of the valve included in the outdoor unit may include reducing the opening degree of the valve when the temperature difference increases.

The adjusting the opening degree of the valve included in the outdoor unit may include determining whether hot water discharged from the hydro unit satisfies a hot water discharge condition to discharge hot water having a temperature lower than a reference temperature, and adjusting the opening degree of the valve such that the adjusted opening degree corresponds to a minimum opening degree when the hot water discharge condition is satisfied.

The determining whether the hot water discharge condition is satisfied may include detecting a pressure of an outlet side of the compressor, and determining that the hot water discharge condition is satisfied, when the detected pressure is lower than a predetermined high temperature.

The determining whether the hot water discharge condition is satisfied may include detecting a temperature of water discharged from the hydro unit, and determining that the hot water discharge condition is satisfied when the temperature of the water discharged from the hydro unit is lower than a predetermined temperature.

The method may further include determining whether the air stream heating operation and the cold water operation are simultaneously selected, and adjusting the opening degree of the valve included in the outdoor unit and an opening degree of a valve included in the hydro unit, to control overheating, when it is determined that the air stream heating operation and the cold water operation are simultaneously selected.

In accordance with another aspect of the present disclosure, a heat pump including an outdoor unit including a compressor and a first heat exchanger, an indoor unit including a second heat exchanger and an expansion valve to perform air stream cooling and heating operations, and a hydro unit including a third heat exchanger connected to the compressor, the first heat exchanger and the expansion valve, to perform cold water and hot water operations, further includes a first flow rate control valve provided at the outdoor unit, a first refrigerant pipe provided between the first flow rate control valve and the expansion valve, a second refrigerant pipe provided between the compressor and the hydro unit, a third refrigerant pipe provided between the first refrigerant pipe and the hydro unit, a second flow rate control valve provided at the third refrigerant pipe, and a control unit to adjust an opening degree of the first flow rate control valve when the air stream cooling operation and the hot water operation are simultaneously selected, and to adjust an opening degree of the second flow rate control valve when the air stream heating operation and the hot water operation are simultaneously selected.

The heat pump may further include a first electromagnetic valve provided at a portion of the second refrigerant pipe between an outlet side of the compressor and the hydro unit, the first electromagnetic valve being opened only during the hot water operation, a second electromagnetic valve provided at a portion of the second refrigerant pipe between an inlet side of the compressor and the hydro unit, the second electromagnetic valve being opened only during the cold water operation, and a third electromagnetic valve provided at the first refrigerant pipe between the indoor unit and the outdoor unit, the third electromagnetic valve being closed when only the cold water operation or the hot water operation is performed.

The outdoor unit may further include a fourth electromagnetic valve to bypass a flow of refrigerant during the air stream cooling operation or the cold water operation.

When the air stream heating operation and the cold water operation are simultaneously selected, the control unit may close the fourth electromagnetic valve while adjusting opening degrees of the first and second flow rate control valves.

The control unit may adjust the opening degree of the second flow rate control valve, based on a pressure of an inlet side of the compressor, when the air stream cooling operation and the cold water operation are simultaneously selected.

The control unit may adjust the opening degree of the second flow rate control valve when the pressure of the inlet side of the compressor is lower than a predetermined low temperature, to control overheating, and may close the second flow rate control valve when the pressure of the inlet side of the compressor is not lower than the predetermined low temperature.

The control unit may identify a capacity of the indoor unit, selects an opening degree of the second flow rate control valve corresponding to the identified capacity, and may adjust the opening degree of the second flow rate control valve such that the adjusted opening degree corresponds to the selected opening degree.

The control unit may finely adjust the selected opening degree of the second flow rate control valve, to maintain a predetermined reference high temperature during an air stream heating operation.

The control unit may calculate a difference between a temperature of water in the hydro unit and a predetermined water temperature, may select an opening degree of the first flow rate control valve corresponding to the temperature difference, and may adjust the opening degree of the first flow rate control valve such that the adjusted opening degree corresponds to the selected opening degree.

The selected opening degree of the first flow rate control valve may be finely adjusted such that a predetermined reference low pressure is maintained during the air stream cooling operation.

The control unit may adjust the opening degree of the second flow rate control valve such that the adjusted opening degree corresponds to a maximum opening degree, when only the hot water operation is selected, and may adjust the opening degree of the first flow rate control valve such that the adjusted opening degree corresponds to a maximum opening degree, when only the air stream cooling operation is selected.

The first flow rate control valve may lower a pressure of refrigerant supplied to the first heat exchanger during the air stream heating operation. The second flow rate control valve may lower a pressure of refrigerant supplied to the third heat exchanger during the cold water operation. The expansion valve may lower a pressure of refrigerant supplied to the second heat exchanger during the air stream cooling operation.

In accordance with one aspect of the present disclosure, it may be possible to achieve an enhancement in the utility of the heat pump because the air stream cooling and heating operations and the cold water and hot water operations are controlled by a single control unit.

Also, the heat pump is excellent in terms of general purpose features because the indoor unit and the hydro unit are connected in parallel to the single outdoor unit, and at least one of the air stream cooling and heating operations and cold water and hot water operations is selected, if necessary. Accordingly, there is a great convenience in that it may be possible to achieve air stream cooling and heating, and to use cold water and hot water in accordance with the user's desire without being influenced by seasons.

In addition, it may be possible to rapidly vary the condition of air in an indoor space by performing the air stream cooling and heating operations using air steam. Also, since a radiant heating operation is carried out after completion of the air stream heating operation, it may be possible to eliminate user discomfort caused by hot indoor air. In summer, it may be possible to achieve an enhancement in energy efficiency through recovery of waste heat by enabling supply of hot water while performing air stream cooling.

Thus, it may be possible to inexpensively obtain the same effects as in the case in which both a heat pump for air stream cooling and heating and a heat pump for cold water and hot water operations are installed.

Also, it may be possible to achieve comfort cooling and heating and supply of hot water, using reduced installation and operation costs, as cooling and heating operations are controlled to avoid inefficiency of sensible heat and sensible cool, and cold water and hot water operations are carried out using additional heat sources.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described with reference to the accompanying drawings.

Figure 1:
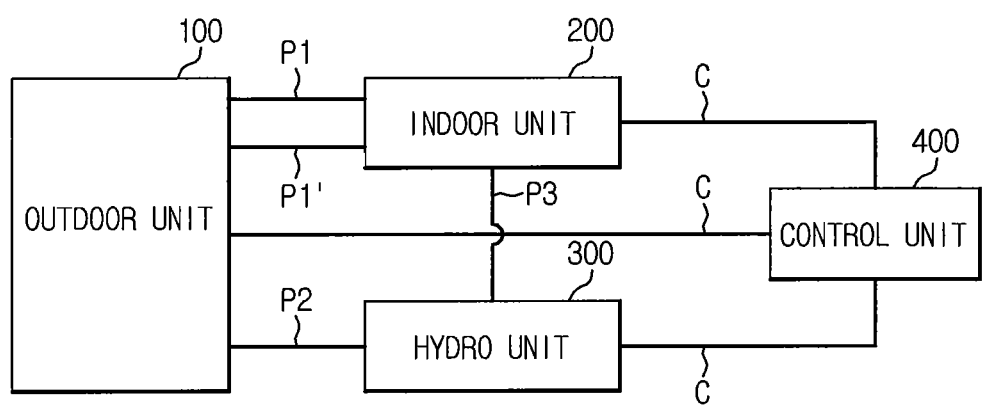
FIG. 1 is a block diagram illustrating a configuration of a heat pump according to an exemplary embodiment of the present disclosure.
Figure 2:
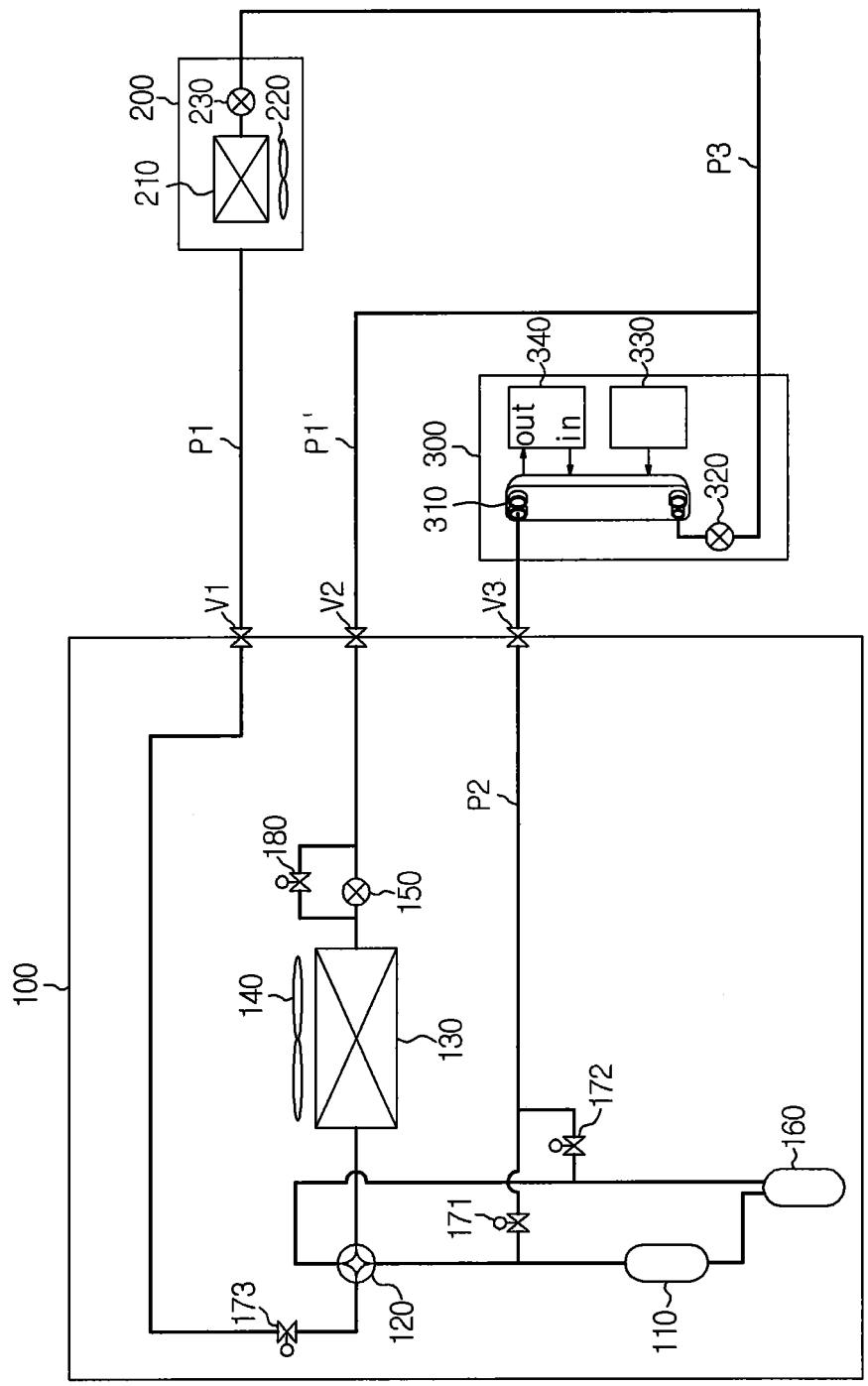
FIG. 2 is a circuit diagram illustrating a detailed configuration of the heat pump according to an exemplary embodiment of the present disclosure.

FIG. 1 is a block diagram illustrating a configuration of a heat pump according to an exemplary embodiment. FIG. 2 is a circuit diagram illustrating a detailed configuration of the heat pump according to an exemplary embodiment. The heat pump includes an outdoor unit 100, an indoor unit 200, a hydro unit 300, and a control unit 400.

In detail, the heat pump includes the outdoor unit 100, which is installed outdoors, the indoor unit 200, which is installed at an indoor space to perform cooling/heating operation, thereby cooling/heating indoor air in an air stream manner, the hydro unit 300, which performs cold water/hot water operation to generate cold/hot water, and heats the floor of the indoor space in a radiant manner, using the hot water, and the control unit 400, which controls driving of the outdoor unit 100, indoor unit 200, and hydro unit 300.

The heat pump further includes first refrigerant pipes p1 and p1' installed between the outdoor unit 100 and the indoor unit 200 to allow refrigerant to be circulated therethrough in accordance with a refrigeration cycle, a second refrigerant pipe p2 installed between the outdoor unit 100 and the hydro unit 300 to allow the refrigerant to be circulated therethrough in accordance with the refrigeration cycle, and a third refrigerant pipe p3 installed between the indoor unit 200 and the hydro unit 300 to allow the refrigerant to be circulated therethrough in accordance with the refrigeration cycle. The heat pump also includes a cable c to electrically connect the outdoor unit 100, indoor unit 200, hydro unit 300, and control unit 400, and to transmit control signals from the control unit 400 to the units 100, 200, and 300.

The third refrigerant pipe p3 is connected to the first refrigerant pipe p1', which is connected to a first flow rate control valve 150 included in the outdoor unit 100. Accordingly, the third refrigerant pipe p3 guides refrigerant discharged from the hydro unit 300 to the outdoor unit 100 during hot water operation, and guides refrigerant supplied from the outdoor unit 100 to an accumulator 160 during cold water operation.

In more detail, the outdoor unit 100 is connected to the indoor unit 200 via the first refrigerant pipes p1 and p1', and is connected to the hydro unit 300 via the second refrigerant pipe p2 while being electrically connected with the control unit 400, to distribute and control the flow of refrigerant circulated through the indoor unit 200 and hydro unit 300.

The outdoor unit 100 includes a compressor 110, which sucks low-temperature and low-pressure refrigerant, compresses the refrigerant into a high-temperature and high-pressure state, and discharges the resultant refrigerant, a 4-way valve 120 installed at an outlet of the compressor 110 to change the flow direction of the refrigerant in accordance with air stream cooling/heating operation, a first heat exchanger 130 to exchange heat with outdoor air, and an outdoor fan 140, which is rotated by a fan motor (not shown) to forcibly blow air present around the heat exchanger 130. The first flow rate control valve 150, which is also included in the outdoor unit 100, is arranged in the first refrigerant pipe p1', which connects the first heat exchanger 130 and the indoor Unit 200, to decrease the pressure and temperature of the refrigerant, and thus to enable easy heat absorption through evaporation of the refrigerant. The accumulator 160 is also included in the outdoor unit 100. The accumulator 160 is arranged between the 4-way valve 120 and the inlet of the compressor 110, to temporarily store a mixture of oil and condensed liquid refrigerant when the condensed liquid refrigerant is introduced through the 4-way valve 120, and then to separate a non-vaporized liquid refrigerant component from the mixture, thereby preventing the liquid refrigerant from being introduced into the compressor 110, and thus preventing the compressor 110 from being damaged.

During air stream heating, the 4-way valve 120 guides the high-temperature and high-pressure refrigerant discharged from the compressor 110 to the indoor unit 200 while guiding the low-temperature and low-pressure refrigerant from the first heat exchanger 130 to the accumulator 160. In this case, the first heat exchanger 130 performs an evaporator function.

On the other hand, during air stream cooling, the 4-way valve 120 guides the high-temperature and high-pressure refrigerant discharged from the compressor 110 to the first heat exchanger 130 while guiding the low-temperature and low-pressure refrigerant from the indoor unit 200 to the accumulator 160. In this case, the first heat exchanger 130 performs a condenser function. That is, the function of the first heat exchanger 130 in the outdoor unit 100 is determined in accordance with the air stream operation mode.

The first flow rate control valve 150 is an electronic expansion valve (EEV), an opening degree of which is adjustable to adjust the flow rate of refrigerant therethrough. The first flow rate control valve 150 decreases the pressure and temperature of refrigerant supplied to the first heat exchanger 130 during the air stream heating operation.

The outdoor unit 100 further includes an electromagnetic valve for cold/hot water generation control, which controls generation of cold/hot water.

The electromagnetic valve includes a first electromagnetic valve 171 for hot water operation, which is installed between the compressor 110 and the hydro unit 300 to control generation of hot water, a second electromagnetic valve 172 for cold water operation, which is installed between the accumulator 160 and the hydro unit 300 to control generation of cold water, and a third electromagnetic valve 173 for cold water/hot water operation alone, which is installed between the compressor 110 and the indoor unit 200 to control generation of cold/hot water in a state in which an air stream cooling/heating operation is not carried out.

The outdoor unit 100 further includes a fourth electromagnetic valve 180 arranged in parallel with the first flow rate control valve 150. The fourth electromagnetic valve 180 functions as a bypass valve to prevent pressure decrease from occurring during air stream cooling alone or cold water operation alone. The fourth electromagnetic valve 180 may be dispensed with.

The indoor unit 200 cools a certain indoor space in an air stream manner by cooling sucked air through heat exchange carried out during evaporation and condensation of refrigerant or cooling, heating or purifying indoor air through heat discharge, and then discharging the resultant indoor air.

The indoor unit 200 includes a second heat exchanger 210 to exchange heat with indoor air, an indoor fan 220 to be rotated by a fan motor (not shown) so as to forcibly blow heat-exchanged air into the indoor space, and an expansion valve 230 to decrease the pressure and temperature of refrigerant.

The expansion valve 230 is an electronic expansion valve, which is capable of adjusting an opening degree thereof to adjust the flow rate of refrigerant therethrough. The expansion valve 230 decreases the pressure and temperature of refrigerant supplied to the second heat exchanger 210 during air stream heating.

That is, the heat pump performs pressure-decreasing expansion through the first flow rate control valve 150 during air stream heating, and performs pressure-decreasing expansion through the expansion valve 230 during air stream cooling.

The indoor unit 200 is connected to the hydro unit 300 via a refrigerant pipe p3, to receive refrigerant from the hydro unit 300 during air stream cooling.

The hydro unit 300 receives water from a water supplier 330. The hydro unit 300 heats the received water using heat of condensation in the refrigeration cycle, to generate hot water, or cools the received water using absorbed heat in the refrigeration cycle, to generate cold water.

The hydro unit 300 carries out generation of hot water or cold water in accordance with an operation for controlling opening/closing of the first and second electromagnetic valves 171 and 172 installed at the refrigerant pipe p2.

In more detail, when the first electromagnetic valve 171 is opened, and the second electromagnetic valve 172 is closed, the hydro unit 300 operates as a condenser, which receives and condenses high-temperature and high-pressure refrigerant from the compressor 110, to liquify the refrigerant, thereby generating hot water. On the other hand, when the first electromagnetic valve 171 is closed, and the second electromagnetic valve 172 is opened, the hydro unit 300 operates as an evaporator, which carries out heat absorption while vaporizing the refrigerant, thereby generating cold water. Thus, the hydro unit 300 supplies low-pressure refrigerant to the accumulator 160

The hydro unit 300 includes a third heat exchanger 310, which condenses and liquifies refrigerant to carry out outward discharge of heat, or vaporizes refrigerant to carry out heat absorption, and a second flow rate control valve 320, which is connected to an outlet of the third heat exchanger 310 to decrease the pressure and temperature of refrigerant while adjusting the amount of refrigerant required between air stream cooling/heating and hot water operation. The water supplier 330, which supplies water to the hydro unit 300, is also included in the hydro unit 300. The hydro unit 300 further includes a water tank 340 to store water heat-exchanged in the third heat exchanger 310. Here, water in the water tank 340 may be exchanged in a circulation manner with water present in a housing, which accommodates the third heat exchanger 310.

The third heat exchanger 310 is disposed in the housing, which stores water supplied from the water supplier 330. The housing has a pipe inlet, through which a refrigerant pipe enters the housing, a pipe outlet, through which the refrigerant pipe emerges from the housing, a water supply port, through which water is supplied to the interior of the housing, a water outlet, through which water is discharged from the housing to the water tank 340, and a water inlet, through which water from the water tank 340 is introduced into the housing.

The water, which is stored in the housing after being heat-exchanged in the third heat exchanger 310, is discharged through the water outlet, to be stored in the water tank 340. The water stored in the water tank 340 is used as wash water and heating water. The water tank 340 is connected to a cold/hot water pipe line, through which wash water is discharged, and a floor pipe line, through which heating water is circulated to perform radiant heating. Thus, the water tank 340 discharges water into at least one of the cold/hot water pipe line and floor pipe line.

The second flow rate control valve 320 is an electronic expansion valve (EEV), which is capable of adjusting an opening degree thereof to adjust the flow rate of refrigerant therethrough. The second flow rate control valve 320 decreases the pressure and temperature of refrigerant supplied to the third heat exchanger 310 during cold water operation.

The heat pump further includes a valve V1 installed at the first refrigerant pipe p1 between the outdoor unit 100 and the indoor unit 200, a valve V2 installed at the first refrigerant pipe p1' between the outdoor unit 100 and the indoor unit 200, and a valve V3 installed at the second refrigerant pipe p2 between the outdoor unit 100 and the hydro unit 300.

The control unit 400 is connected to the outdoor unit 100, indoor unit 200, and hydro unit 300 by cables c in a wired/wireless manner. The control unit 400 controls driving of the outdoor unit 100, indoor unit 200, and hydro unit 300 based on an operation mode and a target temperature, which are input by the user.

The user may select air stream cooling/heating, radiant cooling/heating, and water cooling/heating. For such operations, there are an air-to-air (ATA) operation mode in which cooling/heating is carried out in an air stream manner, an air-to-water (ATVV) operation mode in which cold water/hot water operation is carried out to generate cold/hot water, and cooling/heating is carried out in a radiant manner using the generated cold/hot water, and a hybrid (ATA & ATVV) operation mode in which air stream cooling/heating and cold water/hot water operation are selectively carried out.

The hybrid operation mode includes a first hybrid operation mode, in which air stream heating and hot water operation are carried out, a second hybrid operation mode, in which air stream cooling and hot water operation are carried out, a third hybrid operation mode, in which air stream heating and cold water operation are carried out, and a fourth hybrid operation mode, in which air stream cooling and cold water operation are carried out.

It may be possible to control supply of cold/hot water or radiant cooling/heating in the cold water/hot water operation mode and hybrid operation mode by controlling valves (not shown) provided at the cold/hot water pipe line and floor pipe line.

Figure 3:
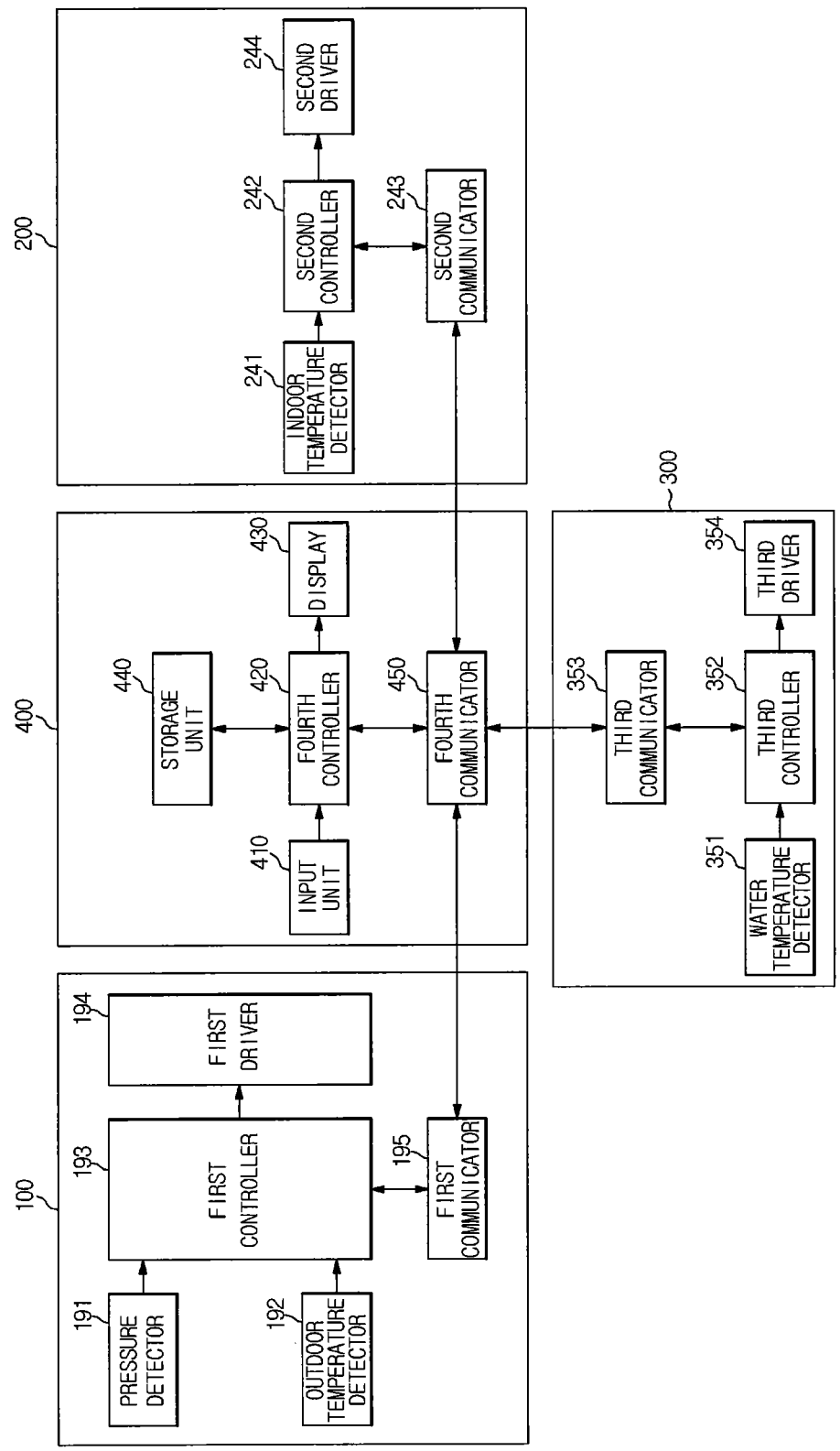
FIG. 3 is a block diagram illustrating a control configuration of the heat pump according to an exemplary embodiment of the present disclosure.

FIG. 3 is a block diagram illustrating a control configuration of the heat pump according to an exemplary embodiment.

The outdoor unit 100 includes a pressure detector 191, an outdoor temperature detector 192, a first controller 193, a first driver 194, and a first communicator 195.

The pressure detector 191 may include pressure detectors respectively arranged at the inlet and outlet sides of the compressor 110 to detect a pressure in a high pressure section of the compressor 110 and a pressure in a low pressure section of the compressor 110. Each pressure detector transmits the detected pressure value to the first controller 193. The pressure detectors will be designated by reference numeral "191".

Each pressure detector 191 may directly detect pressure using a pressure meter or may indirectly detect pressure, based on condensation temperature and evaporation temperature.

The inlet side of the compressor 110 is a low pressure section maintained in a low pressure state. The pressure of the low pressure section is detected by the pressure detector 191 installed at the low pressure section. On the other hand, the outlet side of the compressor 110 is a high pressure section maintained in a high pressure state. The pressure of the high pressure section is detected by the pressure detector 191 installed at the high pressure section.

Alternatively, pressure detectors may be installed at certain portions of a refrigeration cycle established in the outdoor unit 100 where high pressure and low pressure sections are established, respectively.

The outdoor temperature detector 192 detects the outdoor temperature where the outdoor unit 100 is installed, and transmits the detected temperature value to the first controller 193.

The first controller 193 controls driving of the first communicator 195 to allow the values respectively representing the outdoor temperature, the pressure of the low pressure section, and the pressure of the high pressure section to be transmitted to the control unit 400.

Upon receiving a control command from the control unit 400 via the first communicator 195, the first controller 193 generates a drive control signal corresponding to the control command, and outputs the generated drive control signal to the first driver 194.

In response to the drive control signal from the first controller 193, the first driver 194 drives the first, second, and third electromagnetic valves 171, 172, and 173, the fourth electromagnetic valve 180, the first flow rate control valve 150, the 4-way valve 120, the compressor 110, and the outdoor fan 140.

The first communicator 195 performs communication with the control unit 400 in accordance with a command from the first controller 193. The first communicator 195 may directly communicate with the indoor unit 200 and hydro unit 300.

The indoor unit 200 may include an indoor temperature detector 241, a second controller 242, a second communicator 243, and a second driver 244.

The indoor temperature detector 241 detects the temperature of the indoor space where the indoor unit 200 is installed, and transmits the detected temperature value to the second controller 242.

The second controller 242 controls driving of the second communicator 243 to allow the value representing the indoor temperature to be transmitted to the control unit 400.

In response to a control command received from the control unit 400 via the second communicator 243, the second controller 242 transmits, to the second driver 244, a drive control signal corresponding to the control command.

The second communicator 243 performs communication with the control unit 400 in accordance with a command from the second controller 242. The second communicator 243 may directly communicate with the outdoor unit 100 and hydro unit 300.

The second driver 244 drives the expansion valve 230 and outdoor fan 220 in accordance with the drive control signal from the second controller 242.

The hydro unit 300 includes a water temperature detector 351, a third controller 352, a third communicator 353, and a third driver 354.

The water temperature detector 351 may include water temperature detectors respectively arranged at the water inlet and outlet of the housing accommodating the third heat exchanger 310, to detect the temperature of water introduced through the water inlet of the housing into the heat exchanger 310 and the temperature of water discharged through the water outlet of the housing from the heat exchanger 310. The water inlet and outlet of the housing are connected to the water tank 340.

The third controller 352 controls driving of the third communicator 353 to allow values representing the temperature of introduced water and the temperature of discharge water to be transmitted to the control unit 400.

In response to a control command received from the control unit 400 via the third communicator 353, the third controller 352 transmits, to the third driver 354, a drive control signal corresponding to the control command.

The third communicator 353 performs communication with the control unit 400 in accordance with a command from the third controller 352. The third communicator 353 may directly communicate with the outdoor unit 100 and indoor unit 200.

The third driver 354 drives the second flow rate control valve 320 in accordance with the drive control signal from the third controller 352.

The control unit 400 includes an input unit 410, a fourth controller 420, a display 430, a storage unit 440, and a fourth communicator 450.

The input unit 410 receives values, which represent a target indoor temperature and an operation mode and are input by the user. The input unit 410 transmits the input values to the fourth controller 420.

The fourth controller 420 transmits a drive control signal for the outdoor unit 100, indoor unit 200, and hydro unit 330 to the outdoor unit 100, indoor unit 200, and hydro unit 330 so that an operation corresponding to the operation mode input through the input unit 410 is performed.

The drive control signals are adjusted based on information detected by the outdoor unit 100, indoor unit 200, and hydro unit 300.

In more detail, the fourth controller 420 transmits the following signals to the outdoor unit 100, indoor unit 200, and hydro unit 330.

That is, the fourth controller 420 determines whether the input operation mode is air stream heating or air stream cooling, and transmits an opening/closing way control signal for the 4-way valve 120 to the outdoor unit 100 in accordance with the result of the determination. When air stream cooling/heating and cold water/hot water operation are to be carried out, the fourth controller 420 identifies the capacities of the indoor unit 200 and hydro unit 300. In accordance with the result of the identification, the fourth controller 420 transmits drive control signals for the compressor 110, accumulator 160, and outdoor fan 140 to the outdoor unit 100. The fourth controller 420 also transmits a drive control signal for the indoor fan 220 to the indoor unit 200.

When air stream heating is carried out irrespective of cold water/hot water operation, the fourth controller 420 transmits a closing control signal for the fourth electromagnetic valve 180. On the other hand, when air stream cooling operation is to be carried out, the fourth controller 420 transmits an opening control signal for the fourth electromagnetic valve 180 to the outdoor unit 100.

When only air stream cooling/heating is selected, the fourth controller 420 transmits closing control signals for the first and second electromagnetic valves 171 and 172 and an opening control signal for the third electromagnetic valve 173, in order to enable air stream cooling/heating alone to be carried out. On the other hand, if only hot water operation or radiant heating is selected, the fourth controller 420 transmits closing control signals for the second and third electromagnetic valves 172 and 173 and an opening control signal for the first electromagnetic valve 171, in order to enable the hot water operation alone to be carried out.

Also, when air stream cooling/heating and hot water operation are selected from the hybrid (ATA & ATW) operation mode, the fourth controller 420 transmits opening control signals for first and third electromagnetic valves 171 and 173 and a closing control signal for the second electromagnetic valve 172. On the other hand, when air stream cooling/heating and cold water operation are selected, the fourth controller 420 transmits opening control signals for the second and third electromagnetic valves 172 and 173 and a closing control signal for the first electromagnetic valve 171.

In the air stream cooling/heating operation, the fourth controller 420 transmits an opening control signal for the first flow rate control valve 150 to the outdoor unit 100 while transmitting an opening control signal for the expansion valve 230 to the indoor unit 200. On the other hand, when the air stream cooling/heating operation is not carried out, the fourth controller 420 transmits a closing control signal for the first flow rate control valve 150 while transmitting a closing control signal for the expansion valve 230 to the indoor unit 200.

When hot water operation is carried out under the condition that air stream heating operation is not carried out, the fourth controller 420 controls the second flow rate control valve 320 such that the opening degree of the second flow rate control valve 320 is maximized. On the other hand, when hot water operation is not carried out under the condition that air stream cooling operation is carried out, the fourth controller 420 controls the first flow rate control valve 150 such that the opening degree of the first flow rate control valve 150 is maximized.

In the air stream heating and hot water operation, the fourth controller 420 transmits the opening degree control signal for the second flow rate control valve 320 to the hydro unit 300. On the other hand, in the air stream cooling and hot water operation, the fourth controller 420 transmits the opening degree control signal for the first flow rate control valve 150 to the outdoor unit 100.

The opening degree of the second flow rate control valve 320 is compensated based on the outdoor temperature.

In the air stream heating and hot water operation, the fourth controller 420 controls the opening degree of the second flow rate control valve 320 to be minimized when the pressure at the high pressure section of the outdoor unit 100 is lower than a predetermined high pressure or the temperature of the discharge water is lower than a first predetermined temperature. On the other hand, in the air stream cooling and hot water operation, the fourth controller 420 controls the opening degree of the first flow rate control valve 150 to be minimized when the pressure at the high pressure section of the outdoor unit 100 is lower than the predetermined high pressure or the temperature of the discharge water is lower than a second predetermined temperature.

In the air stream heating and cold water operation, the fourth controller 420 transmits the opening degree control signal for the first flow rate control valve 150 to the outdoor unit 100 so as to control overheating.

In the air stream cooling and cold water operation, the fourth controller 420 transmits the closing control signal for the second flow rate control valve 320 to the hydro unit 300, and transmits an opening degree control signal for the second flow rate control valve 320 to the hydro unit 300 after a predetermined time elapses, in order to avoid cooling failure.

The opening degree control signal for the second flow rate control valve 320 is an opening degree at which a reference low pressure is maintained.

The display 430 displays indoor temperature, indoor humidity, target temperature, and operation mode.

The storage unit 440 stores the opening degree of the second flow rate control valve 320 corresponding to the capacity of the indoor unit 200, the opening degree of the first flow rate control valve 150 corresponding to a predetermined temperature difference, and a compensated opening degree of the second flow rate control valve 320 corresponding to the outdoor temperature.

The storage unit 440 stores the predetermined high pressure, which is set to determine a cold air discharge condition to discharge cold air and a hot water discharge condition to discharge hot water having a temperature lower than a reference temperature, a reference high temperature set to avoid inefficiency of sensible heat during air stream heating, a reference low temperature set to avoid inefficiency of sensible cool during air stream cooling, the first predetermined temperature, which is set to determine a cold air discharge condition, and the second predetermined temperature, which is set to determine the hot water discharge condition to discharge hot water having a temperature lower than the reference temperature.

The predetermined temperature difference is at least one of the difference between the temperature of water introduced from the water tank 340 into the housing of the third heat exchanger 310 and a predetermined introduced water temperature and the difference between the temperature of discharge water discharged from the housing of the third heat exchanger 310 into the water tank 340 and a predetermined discharge water temperature.

The fourth communicator 450 communicates with the first communicator of the outdoor unit, the second communicator of the indoor unit, and the third communicator of the hydro unit so as to transmit control signals to the outdoor unit, indoor unit, and hydro unit. The fourth communicator 450 uses at least one of wired and wireless communication.

Control operation for the fourth controller 420 in the control unit 400 may be carried out in at least one of the first controller of the outdoor unit, the second controller of the indoor unit, and the third controller of the hydro unit.

Figure 4:
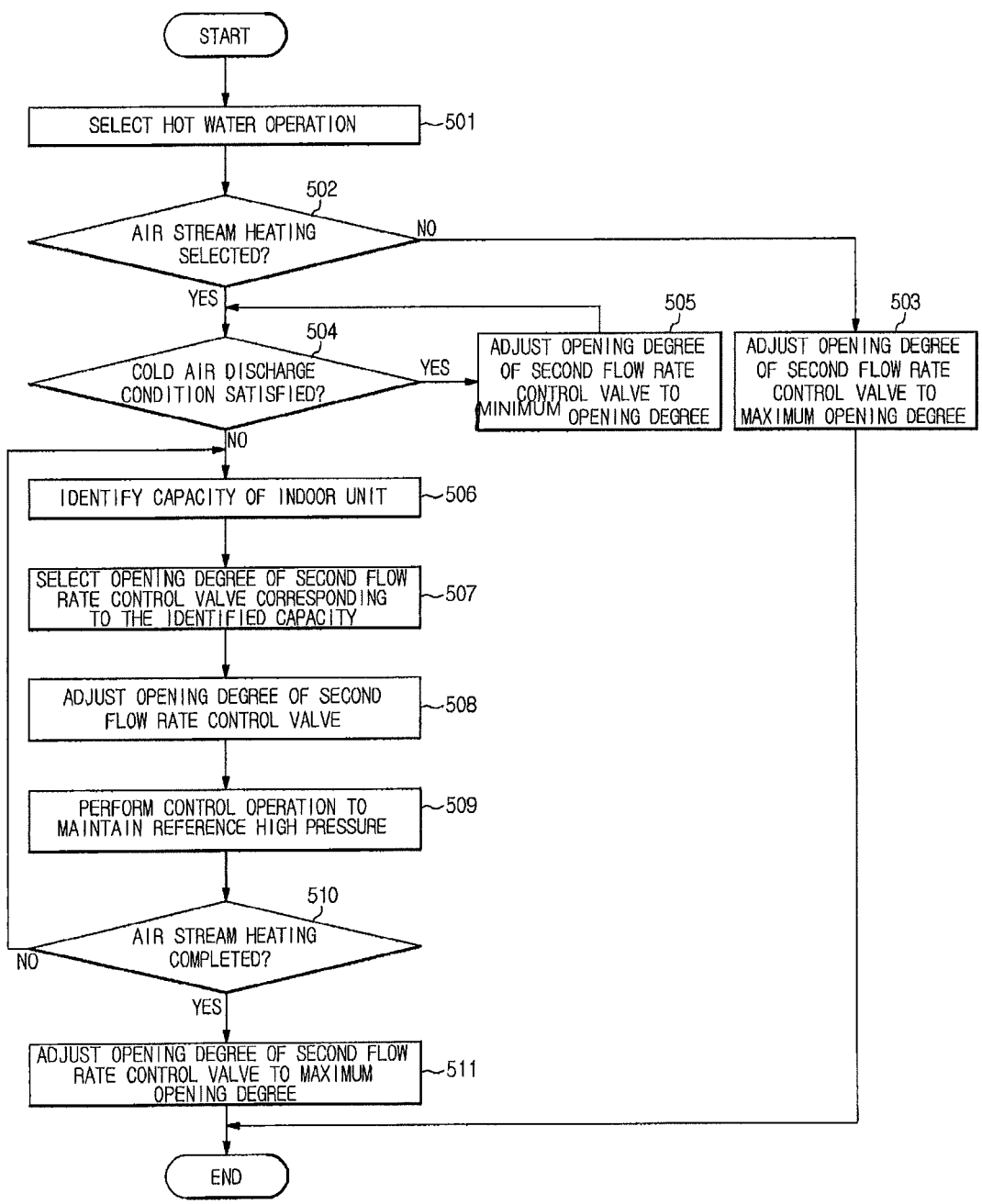
FIGS. 4 and 5 are flowcharts illustrating a control operation of the heat pump according to an exemplary embodiment of the present disclosure.

FIG. 4 is a flowchart illustrating a control operation of the heat pump according to an exemplary embodiment. In particular, FIG. 4 is a flowchart illustrating a control operation for air stream heating and hot water operation.

When water heating is selected by the user (501), the heat pump determines whether air stream heating is selected together with water heating (502). That is, it is determined whether air stream heating and water heating are to be simultaneously carried out.

When it is determined that air stream heating has not been selected under the condition that water heating has been selected, the heat pump controls the second flow control valve 320 of the hydro unit 300 such that the opening degree of the second flow control valve 320 is maximized (503), to maximize the flow rate of refrigerant through the second flow rate control valve 320.

In this case, a large amount of refrigerant flows through the hydro unit 300 which performs a condenser function. As a result, high-temperature heat of condensation is generated, so that a large amount of hot water is generated.

That is, since the heat pump only carries out a hot water operation, only the hydro unit 300 performs a condenser function. In this case, the first heat exchanger 130 of the outdoor unit 100 performs an evaporator function.

The generated hot water may be used as wash water when the valve provided at the hot water pipe line is opened or may be supplied, as heating water, to the floor pipe line when the valve provided at the floor pipe line is opened. That is, the hot water is used for radiant heating.

When it is determined that air stream heating has been selected under the condition that water heating has been selected, the heat pump determines whether a cold air discharge condition to discharge cold air through the indoor unit 200 is satisfied (504).

The cold air discharge condition includes at least one of a condition in which the pressure of the high pressure section of the outdoor unit 100 is lower than the predetermined high pressure and a condition in which the temperature of discharge water of the hydro unit 300 is lower than the second predetermined temperature.

When it is determined that the cold air discharge condition of the indoor unit 200 is satisfied, the heat pump controls the second flow rate control valve 320 of the hydro unit 300 such that the opening degree of the second flow rate control valve 320 is minimized to prevent cold air from being discharged through the indoor unit at an initial stage of the air stream heating operation (505). In accordance with this control, the pressure of the high pressure section of the outdoor unit 100 becomes equal to or higher than the predetermined high temperature.

Accordingly, it may be possible to reduce user discomfort caused by cold air at the initial stage of the air stream heating operation.

When it is determined that the cold air discharge condition of the indoor unit 200 is not satisfied, the heat pump determines that discharge of hot air will begin from the initial stage of the air stream heating operation, and then controls the heating operation of the indoor unit 200.

In this case, the heat pump identifies the predetermined capacity of the indoor unit 200 and the predetermined capacity of the hydro unit 300 (506).

The heat pump then sums the capacities of the indoor unit 200 and hydro unit 300, and calculates the capacity of the outdoor unit 100 corresponding to the summed capacity. The heat pump then controls driving of the outdoor unit 100, based on the calculated capacity.

The summed capacity corresponds to the capacity of the condenser. The capacity of the outdoor unit 100 corresponds to the capacity of the evaporator. Based on these capacities, it may be possible to set the operating factor of the compressor.

In addition, the heat pump may compare a target temperature of the indoor unit 200 with an indoor temperature to calculate an air temperature difference. Taking into consideration the air temperature difference, the heat pump may compensate the predetermined capacity of the indoor unit 200. The heat pump may also compare the temperatures of discharge water and introduced water of the hydro unit 300 with each other to calculate a water temperature difference. Taking into consideration the water temperature difference, the heat pump may compensate the predetermined capacity of the hydro unit 300. The heat pump may then sum the compensated capacities to calculate the capacity of the outdoor unit 100. In this case, accordingly, it may be possible to control driving of the outdoor unit 100 such that the outdoor unit 100 has the calculated capacity.

The heat pump also selects an opening degree of the second flow rate control valve 320 of the hydro unit 300 corresponding to the identified capacity of the indoor unit 200 (507).

Here, the opening degree of the second flow rate control valve 320 corresponding to the capacity of the indoor unit 200 is previously stored. Also, the opening degree is determined based on a result obtained after comparing the capacity requested by the indoor unit 200 and the maximum capacity, which can be supplied by the outdoor unit 100. This opening degree is an opening degree preventing occurrence of a problem associated with sensible heat during air stream heating. That is, the opening degree is an opening degree capable of forming a reference high pressure at the high pressure section of the outdoor unit 100.

Also, it may be possible to compensate the previously-stored opening degree of the second flow rate control valve 320 in accordance with the outdoor temperature. In this case, the opening degree of the second flow rate control valve 320 compensated in accordance with the outdoor temperature may also be stored for subsequent use. This will be described with reference to FIG. 5.

Figure 5:
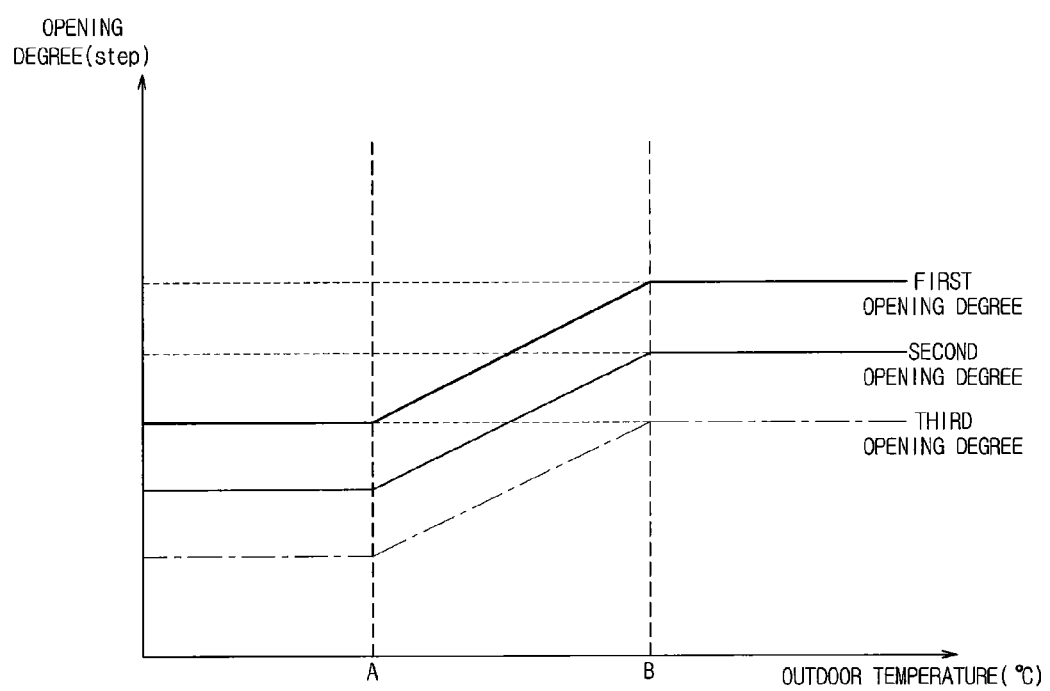

FIG. 5 is a graph depicting variation in the opening degree of the second flow rate control valve based on an outdoor temperature. In accordance with a lower outdoor temperature, the expansion valve is opened at a smaller one of the predetermined opening degrees (first opening degree>second opening degree>third opening degree).

This is because, when the outdoor temperature is low, the pressure of the first heat exchanger 130 of the outdoor unit 100 becomes lower than the predetermined low pressure, the discharge pressure of the compressor 110, to which refrigerant has been supplied from the first heat exchanger 130, also becomes lower than the predetermined high pressure, and the pressure of the second heat exchanger 210 of the indoor unit 200 also becomes lower than a predetermined pressure, so that hot air having a lower temperature than a target temperature is generated.

For this reason, it may be necessary to increase the amount of refrigerant supplied to the second heat exchanger 210 of the indoor unit 200. To this end, it may be necessary to reduce the opening degree of the second flow rate control valve 320 of the hydro unit 300 such that the opening degree is less than a predetermined opening degree.

As the first, second, and third opening degrees of the second flow rate control valve 320 of the hydro unit 300 are compensated in accordance with the outdoor temperature, it may be possible to solve a problem occurring in association with sensible heat due to a lower outdoor temperature.

Subsequently, the heat pump adjusts the opening degree of the second flow rate control valve 320 of the hydro unit 300 (508).

For a higher capacity of the indoor unit 200, the opening degree of the second flow rate control valve 320 is reduced.

That is, when the capacity of the indoor unit 200 is increased, the second flow rate control valve 320 is adjusted to have a reduced opening degree, so that an increased amount of refrigerant is supplied to the second heat exchanger 210 of the indoor unit 200. On the other hand, when the capacity of the indoor unit 200 is reduced, the second flow rate control valve 320 is adjusted to have an increased opening degree, so that a reduced amount of refrigerant is supplied to the second heat exchanger 210 of the indoor unit 200. Thus, it may be possible to satisfy the required capacity of the indoor unit 200, and thus to prevent a problem associated with sensible heat from occurring during air stream heating.

Thereafter, the heat pump performs a control operation to maintain the high pressure of the high pressure section of the outdoor unit 100 at a reference high pressure by finely increasing or reducing the adjusted opening degree of the second flow rate control valve 320 (509).

The heat pump then determines whether air stream heating has been completed (510). When it is determined that air stream heating has been completed, the heat pump maximize the opening degree of the second flow rate control valve 320 of the hydro unit 300 to be maximized (511).

At this time, the heat pump performs only the hot water operation. That is, the hydro unit 300 performs a condenser function. In accordance with generation of heat of condensation, hot water is generated in the hydro unit 300.

The generated hot water is used as wash water, or is supplied, as heating water, to the floor pipe line. Accordingly, radiant heating is carried out.

The air stream heating is completed when the time, for which the target temperature is maintained in accordance with the air stream heating, exceeds a predetermined time or when the indoor unit is turned off by the user.

When it is determined that air stream heating is still carried out, the heat pump again identifies the capacity of the indoor unit 200, and then adjusts the opening degree of the second flow rate control valve 320 such that the opening degree corresponds to the identified capacity. Subsequently, the heat pump finely adjusts the adjusted opening degree of the second flow rate control valve 320 so that the high pressure section of the outdoor unit 100 is maintained at the reference high pressure.

The air stream heating operation of the heat pump is carried out as follows.

The operation position of the 4-way valve 120 is changed to cause the high-pressure refrigerant discharged from the compressor 110 to be directly supplied to the second heat exchanger 210 of the indoor unit 200. At the same time, the outdoor fan 140 is driven.

That is, when the compressor 110 operates, the high-temperature and high-pressure refrigerant discharged from the compressor 110 is fed to the second heat exchanger 210 of the indoor unit 200. The refrigerant exchanges heat with indoor air blown to the second heat exchanger in accordance with rotation of the indoor fan 220 while passing through the second heat exchanger 210. Thus, the indoor space is heated.

The refrigerant is condensed in accordance with heat exchange with the indoor air. The refrigerant is pressure-reduced while passing through the first flow rate control valve 150. The refrigerant is then evaporated in the first heat exchanger 130 of the outdoor unit 100, which functions as an evaporator. Subsequently, the evaporated refrigerant is returned to the compressor 110.

As described above, hot air is discharged from the second heat exchanger 210 of the indoor unit 200 during heating operation. In order to increase the heat exchange efficiency of the first heat exchanger 130 in the outdoor unit 100, the outdoor fan 140 is driven. That is, as the outdoor fan 140 rotates, outdoor air is forcibly convected to suck heat from the first heat exchanger 130.

The hot water operation is carried out as follows.

The refrigerant discharged in accordance with driving of the compressor 110 is fed to the third heat exchanger 310 of the hydro unit 300, which performs a condenser function. The refrigerant from the third heat exchanger 310 is fed to the first heat exchanger 130 via the second flow rate control valve 320 and the first flow rate control valve 150 of the outdoor unit 100. After performing heat exchange in the first heat exchanger 130, the refrigerant is fed to the accumulator 160 via the 4-way valve 120. In the accumulator 160, a liquid component of the refrigerant is separated from the refrigerant. The liquid-free refrigerant is again fed to the compressor 110.

While passing through the third heat exchanger 310 of the hydro unit 300, the refrigerant exchanges heat with water flowing around the third heat exchanger 310. As a result, hot water is generated in the hydro unit 300. The temperature and generation time of hot water generated in the hydro unit 300 may be varied in accordance with the opening degree of the second flow rate control valve 320.

Figure 6:
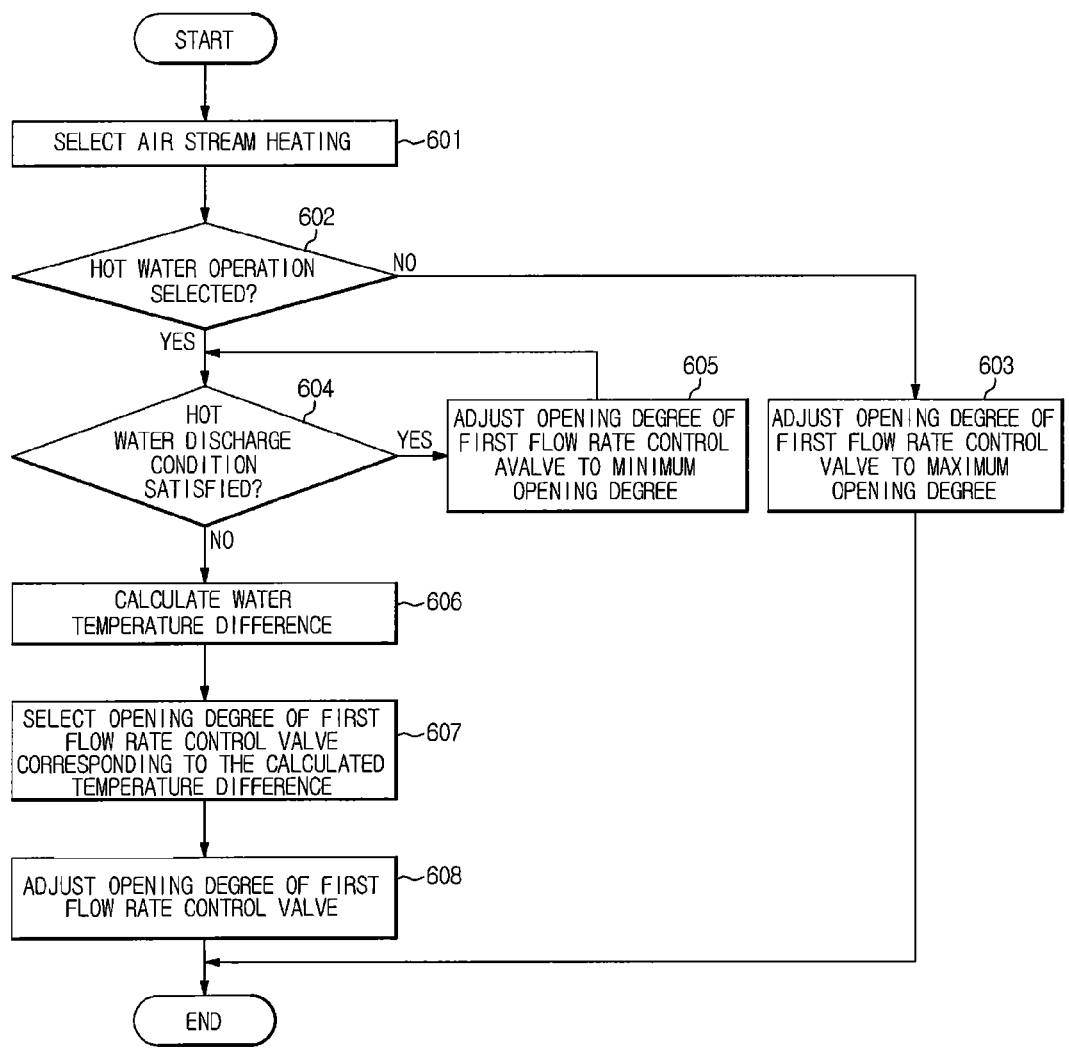
FIG. 6 is a flowchart illustrating operation of the heat pump according to an exemplary embodiment of the present disclosure.

FIG. 6 is a flowchart illustrating operation of the heat pump according to an exemplary embodiment. In particular, FIG. 6 is a flowchart illustrating control operation for air stream cooling and hot water operations according to an exemplary embodiment of the present disclosure.

When air stream cooling is selected by the user (601), the heat pump determines whether hot water operation has also been selected (602). That is, the heat pump determines whether the air stream cooling is selected along with the hot water operation.

When it is determined that the hot water operation has not been selected under the condition that the air stream cooling has been selected, the heat pump controls the first flow rate control valve 150, to maximize the opening degree of the first flow rate control valve 150 (603), thereby maximizing the flow rate of the refrigerant through the first flow rate control valve 150.

In this case, the indoor unit 200 is operable at a maximum capacity because only the second heat exchanger 210 of the indoor unit 200 performs an evaporator function. Also, the outdoor unit 100 is operable at a maximum capacity because only the first heat exchanger 130 of the outdoor unit 100 performs a condenser function.

That is, the opening degree of the first flow rate control valve 150 of the outdoor unit 100 is maximized in accordance with the maximum capacity of the indoor unit 200, to enable the outdoor unit 100 to operate at a maximum capacity, and thus to maximize the amount of the refrigerant supplied to the outdoor unit 100.

When it is determined that the hot water operation has been selected under the condition that air stream cooling has been selected, the heat pump determines whether hot water discharged through the hydro unit 300 satisfies a hot water discharge condition to discharge hot water having a temperature lower than a predetermined reference temperature (604).

That is, it is determined whether the temperature of the discharged hot water is lower than the predetermined reference temperature.

Here, the hot water discharge condition to discharge hot water cooler than the predetermined reference temperature includes at least one of a condition in which the pressure of the high pressure section of the outdoor unit 100 is lower than a predetermined high pressure and a condition in which the temperature of water discharged through the hydro unit 300 is lower than the second predetermined temperature.

When it is determined that the temperature of hot water discharged through the hydro unit 300 is lower than the reference temperature, the heat pump controls the first flow rate control valve 150 of the outdoor unit 100, to minimize the opening degree of the first flow rate control valve 150 (605) such that the pressure of the high pressure section of the outdoor unit 100 is equal to or higher than the predetermined high pressure, and thus to supply a large amount of high-temperature and high-pressure refrigerant to the hydro unit 300 at an early stage of the hot water operation. Accordingly, water within the hydro unit 300 is rapidly heated in a short time, so that no cold water is discharged from the hydro unit 300.

The minimum opening degree is an opening degree allowing refrigerant to flow slowly without pooling.

When it is determined that hot water discharged through the hydro unit 300 does not satisfy the hot water discharge condition to discharge hot water having a temperature lower than the predetermined reference temperature, the heat pump determines that hot water having a temperature not lower than the predetermined reference temperature will be discharged from the early stage of the hot water operation. Based on this determination, the heat pump controls a hot water operation of the hydro unit 300.

That is, the heat pump closes the fourth electromagnetic valve 180 of the outdoor unit 100, to cut off refrigerant flowing through the fourth electromagnetic valve 180. Thus, the heat pump controls distribution of refrigerant to the hydro unit 300 and the first heat exchanger 130 of the outdoor unit 100.

The heat pump detects the temperature of water in the hydro unit 300, and compares the detected water temperature with a predetermined water temperature, to calculate a difference between the two temperatures (606). Here, the temperature of water in the hydro unit 300 includes the temperature of at least one of water introduced into the hydro unit 300 and water discharged from the hydro unit 300.

In more detail, the heat pump detects the temperatures of the introduced water and discharge water of the hydro unit 300. The heat pump then calculates the difference between the detected introduced water temperature and a predetermined introduced water temperature or the temperature between the detected discharge water temperature and a predetermined discharge water temperature. In this case, the predetermined introduced water temperature and the predetermined discharge water temperature are different from each other.

Thereafter, the heat pump selects an opening degree of the first flow rate control valve 150 of the outdoor unit 100 corresponding to the calculated temperature difference (607), and adjusts the opening degree of the first flow rate control valve 150 of the outdoor unit 100 such that the adjusted opening degree corresponds to the selected opening degree (608).

Here, values representing opening degrees of the first flow rate control valve 150 corresponding to various temperature differences are previously stored. The opening degree of the first flow rate control valve 150 has a smaller value, for a greater temperature difference.

That is, for an increased temperature difference, the opening degree of the first flow rate control valve 150 is reduced in order to allow an increased amount of refrigerant to be supplied to the third heat exchanger 310 of the hydro unit 300. On the other hand, for a reduced temperature difference, the opening degree of the first flow rate control valve 150 is increased in order to allow a reduced amount of refrigerant to be supplied to the third heat exchanger 310 of the hydro unit 300. As the amount of refrigerant supplied to the hydro unit 300 is adjusted as described above, generation of heat of condensation from the third heat exchanger 310 of the hydro unit 300 is adjusted.

That is, during air stream cooling and hot water operation, the outdoor unit 100 and hydro unit 300 may operate while sharing the load of the condensation operation because only the indoor unit 200 performs an evaporator function, and the outdoor unit 100 and hydro unit 300 simultaneously perform a condenser function.

As the opening degree of the first flow rate control valve 150 of the outdoor unit 100 is adjusted under the condition in which the second flow rate control valve 320 of the hydro unit 300 is opened to a maximum opening degree, the amount of refrigerant supplied to the hydro unit 300 is adjusted. Accordingly, it may be possible to adjust heat of condensation generated from the hydro unit 300.

Hot water generated in the above-described mode may be used for wash water as a valve provided at the hot water pipe line is opened.

Hereinafter, the second hybrid operation mode of the heat pump, in which air stream cooling and hot water operation are carried out, will be described.

In the second hybrid operation mode, the operation position of the 4-way valve 120 is changed to cause the high-pressure refrigerant discharged from the compressor 110 to be directly supplied to the first heat exchanger 130 of the outdoor unit 100. At the same time, the outdoor fan 140 is driven.

That is, when the compressor 110 operates, the high-temperature and high-pressure refrigerant discharged from the compressor 110 is fed to the first heat exchanger 130 of the outdoor unit 100 performing a condenser function, via the 4-way valve 120.

The refrigerant exchanges heat with outdoor air blown to the first exchanger 130 in accordance with rotation of the outdoor fan 140 while passing through the first exchanger 130. Thus, hot air is discharged to the outdoors.

The refrigerant, which is condensed during the above-described heat exchange, is pressure-reduced while passing through the expansion valve 220 of the indoor unit 20. The pressure-reduced refrigerant then absorbs heat while passing through the second heat exchanger 210 of the indoor unit 200 performing an evaporator function.

The heat-absorbed refrigerant is fed to the compressor 110 via the 4-way valve 120 and accumulator 160.

As described above, during the air stream cooling operation, hot air is generated around the first heat exchanger 130 of the outdoor unit 100, and cold air generated through heat exchange carried out at the second heat exchanger 210 of the indoor unit 200 is forcibly blown to the indoor space by the indoor fan 140.

The refrigerant discharged in accordance with driving of the compressor 110 is fed to the third heat exchanger 310 of the hydro unit 300, which performs a condenser function. The refrigerant from the third heat exchanger 310 is fed to the second heat exchanger 210 via the second flow rate control valve 320 and the expansion valve 220 of the indoor unit 200.

That is, the refrigerant exchanges heat with water present in the hydro unit 300 while passing through the third heat exchanger 310 of the hydro unit 300. As a result, hot water is generated in the hydro unit 300. The generation temperature and time of hot water in the hydro unit 300 may be varied in accordance with the opening degree of the first flow rate control valve 150.

Figure 7:
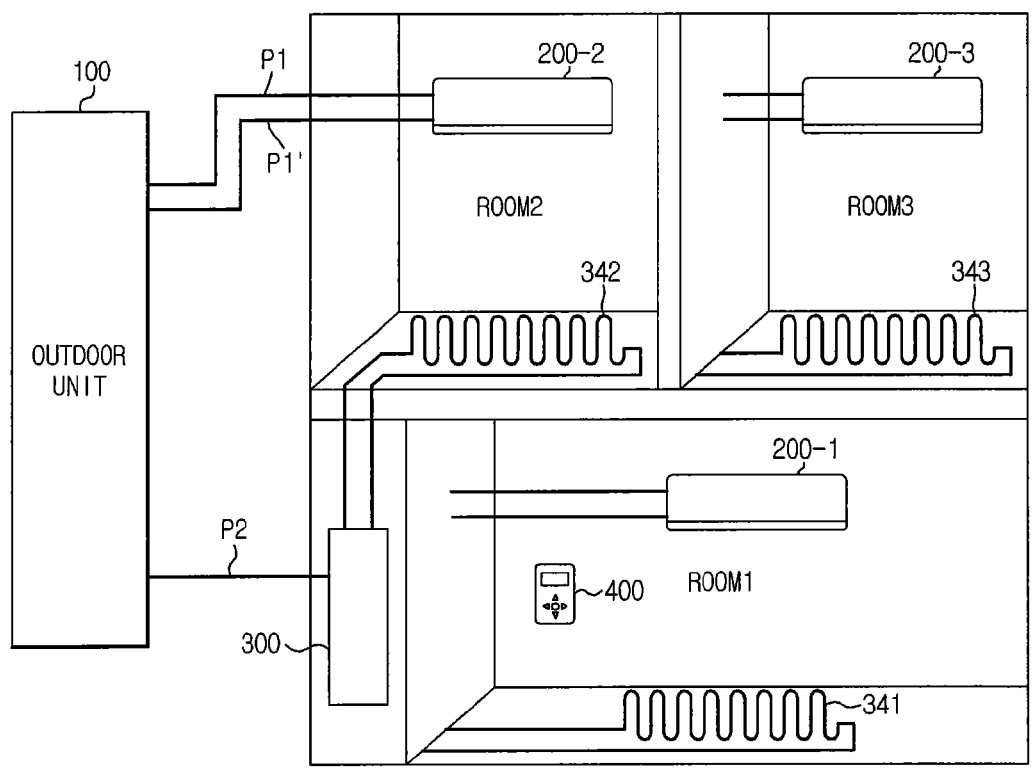
FIG. 7 is a view illustrating a configuration of a heat pump according to another embodiment of the present disclosure.
Figure 8:
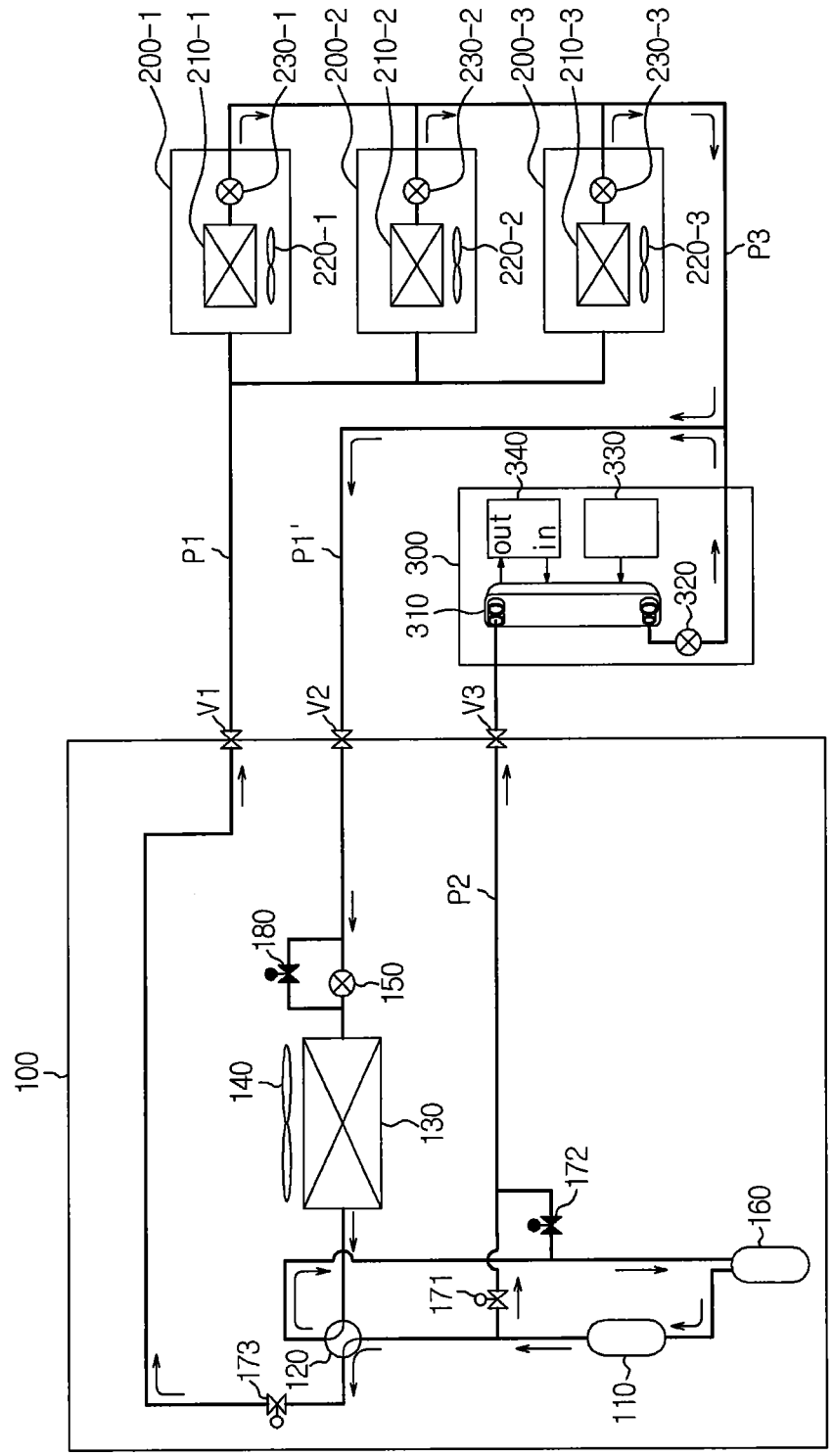
FIG. 8 is a view illustrating a flow of refrigerant generated during air stream heating and hot water operation in the heat pump according to the embodiment of FIG. 7.

FIG. 7 is a view illustrating a configuration of a heat pump according to another embodiment. FIG. 8 is a view illustrating a detailed configuration of the heat pump shown in FIG. 7. In this case, the heat pump includes an outdoor unit 100, a plurality of indoor units 200-1, 200-2 and 200-3, a hydro unit 300, and a controller 400.

In detail, the heat pump includes the outdoor unit 100, which is installed outdoors, the indoor units 200-1, 200-2 and 200-3, which are installed at indoor spaces to perform cooling/heating of the indoor spaces, respectively, the hydro unit 300, which performs cold water/hot water operation to generate cold/hot water, and heats the floors of the indoor spaces in a radiant manner, using the hot water, and the control unit 400, which controls driving of the outdoor unit 100, indoor units 200-1, 200-2 and 200-3, and hydro unit 300.

The heat pump further includes first refrigerant pipes p1 and p1' installed between the outdoor unit 100 and the indoor units 200-1, 200-2 and 200-3 to allow refrigerant to be circulated therethrough in accordance with a refrigeration cycle, a second refrigerant pipe p2 installed between the outdoor unit 100 and the hydro unit 300 to allow the refrigerant to be circulated therethrough in accordance with the refrigeration cycle, and a third refrigerant pipe p3 installed between the hydro unit 300 and the indoor units 200-1, 200-2 and 200-3 to allow the refrigerant to be circulated therethrough in accordance with the refrigeration cycle. The heat pump also includes a cable c to electrically connect the outdoor unit 100, indoor units 200-1, 200-2 and 200-3, hydro unit 300, and control unit 400, and to transmit control signals from the control unit 400 to the units 100, 200-1, 200-2 and 200-3, and 300.

The third refrigerant pipe p3 is connected to the first refrigerant pipe p1', which is connected to a first flow rate control valve 150 included in the outdoor unit 300. Accordingly, the third refrigerant pipe p3 guides refrigerant discharged from the hydro unit 300 to the outdoor unit 100 during hot water operation, and guides refrigerant supplied from the outdoor unit 100 to an accumulator 160 during cold water operation.

The indoor units 200-1, 200-2 and 200-3 are installed in parallel between the first refrigerant pipes p1 and p1'. Each of the indoor units 200-1, 200-2 and 200-3 includes a heat exchanger, an indoor fan, and an expansion valve. The expansion valve is closed when the corresponding indoor unit does not perform refrigeration operation or when the corresponding indoor unit does not perform heating operation. Of course, even under this condition, the expansion valve is periodically opened in order to prevent refrigerant from pooling in the corresponding indoor unit.

Other configurations of the outdoor unit 100 and hydro unit 300 are identical to those of the previous embodiment and, as such, no further description thereof will be given.

Also, the configuration of each of the indoor units 200-1, 200-2 and 200-3 is identical to that of the indoor unit 200 in the previous embodiment and, as such, no further description thereof will be given.

The control unit 400 is connected to the outdoor unit 100, indoor units 200-1, 200-2 and 200-3, and hydro unit 300 by cables c in a wired/wireless manner. The control unit 400 controls driving of the outdoor unit 100, indoor units 200-1, 200-2 and 200-3, and hydro unit 300 based on an operation mode and a target temperature, which are input by the user.

In detail, the control unit 400 controls driving of the outdoor unit 100, indoor units 200-1, 200-2 and 200-3, and hydro unit 300, based on information detected by respective detectors of the outdoor unit 100, indoor units 200-1, 200-2 and 200-3, and hydro unit 300.

The controller 400 also stores identification numbers of the plural indoor units 200-1, 200-2 and 200-3, and controls driving of each of the indoor units 200-1, 200-2 and 200-3, based on a corresponding one of the identification numbers.

The user may select air stream cooling/heating, radiant cooling/heating, and water cooling/heating. For such operations, there are an air-to-air (ATA) operation mode in which cooling/heating is carried out in an air stream manner, an air-to-water (ATW) operation mode in which cold water/hot water operation is carried out to generate cold/hot water, and cooling/heating is carried out in a radiant manner using the generated cold/hot water, and a hybrid (ATA & ATW) operation mode in which air stream cooling/heating and cold water/hot water operation are selectively carried out.

The hybrid operation mode includes a first hybrid operation mode, in which air stream heating and hot water operation are carried out, a second hybrid operation mode, in which air stream cooling and hot water operation are carried out, a third hybrid operation mode, in which air stream heating and cold water operation are carried out, and a fourth hybrid operation mode, in which air stream cooling and cold water operation are carried out.

It may be possible to control supply of cold/hot water or radiant cooling/heating in the cold water/hot water operation mode and hybrid operation mode by controlling valves (not shown) provided at the cold/hot water pipe line and floor pipe line.

When heating operation is carried out, the controller 400 sums the capacities of the plural indoor units 200-1, 200-2 and 200-3, which are previously stored in the controller 400, and controls the compressor 160 to be driven at a capacity corresponding to the summed indoor unit capacity.

The controller 400 compensates the capacity of each of the indoor units 200-1, 200-2 and 200-3 in, accordance with the difference between the indoor temperature of the indoor space where the corresponding indoor unit is installed and the target temperature of the corresponding indoor unit, and controls the compressor 160 to be driven at a capacity corresponding to the compensated indoor unit capacity.

When heating and hot water operation are carried out, the controller 400 adds the capacity of the hydro unit 300 to the sum of the capacities of the indoor units 200-1, 200-2 and 200-3, and controls the compressor 160 to be driven at a capacity corresponding to the capacity obtained after addition. Also, the controller 400 controls the opening degree of the second flow rate control valve 320 provided at the hydro unit 300.

The reason why the capacity of the hydro unit 300 is added to the sum of the capacities of the plural indoor units is because all the plural indoor units 200-1, 200-2 and 200-3 and hydro unit 300 perform a condenser function.

Assuming that the capacity of the outdoor unit is 100, it may be possible to set the maximum capacity of each indoor unit to 100, and it may also be possible to set the maximum capacity of the hydro unit to 100.

The controller 400 controls the opening degree of the second flow rate control valve 320, using a compensation opening degree corresponding to the outdoor temperature.

In heating and hot water operation, the controller 40 controls the opening degree of the second flow rate control valve 320 to be minimized when the pressure at the high pressure section of the outdoor unit 100 is lower than a predetermined high pressure or the temperature of the discharge water is lower than a first predetermined temperature. On the other hand, in the air stream cooling and hot water operation, the controller 400 controls the opening degree of the first flow rate control valve 150 to be minimized when the pressure at the high pressure section of the outdoor unit 100 is lower than the predetermined high pressure or the temperature of the discharge water is lower than a second predetermined temperature.

In cooling and hot water operation, the controller 400 compares the temperature of water introduced into the hydro unit 300 with a predetermined introduced water temperature, to calculate a difference between the compared introduced water temperatures and controls the opening degree of the first flow rate control valve 150 in accordance with the calculated temperature difference.

Alternatively, the controller 400 may compare the temperature of discharge water discharged from the hydro unit 300 with a predetermined discharge water temperature, to calculate a difference between the compared discharge water temperatures, and may control the opening degree of the first flow rate control valve 150 in accordance with the calculated temperature difference.

In cooling and hot water operation, both the first heat exchanger 130 of the outdoor unit 100 and the third heat exchanger 310 of the hydro unit 300 perform a condenser function. Accordingly, it may be possible to adjust the condensation capacity of the third heat exchanger 310 of the hydro unit 300 by adjusting the opening degree of the first flow rate control valve 150 in the outdoor unit 100.

In more detail, when the temperature difference is increased, the opening degree of the first flow rate control valve 150 is reduced to reduce the amount of refrigerant supplied to the first heat exchanger 130 of the outdoor unit 100, and thus to increase the amount of refrigerant supplied to the third heat exchanger 310 of the hydro unit 300. In this case, accordingly, the amount of heat of condensation is increased. On the other hand, when the temperature difference is reduced, the opening degree of the first flow rate control valve 150 is increased to increase the amount of refrigerant supplied to the first heat exchanger 130 of the outdoor unit 100, and thus to reduce the amount of refrigerant supplied to the third heat exchanger 310 of the hydro unit 300. In this case, accordingly, the amount of heat of condensation is reduced.

During the cooling and hot water operation, the controller 400 transmits, to the outdoor unit 100, an opening control signal for the first flow rate control valve 150, to control overheating.

Also, when the cooling and hot water operation is carried out, the controller 400 transmits, to the hydro unit 300, a closing control signal for the second flow rate control valve 320. After a predetermined time elapses, the controller 400 transmits, to the hydro unit 300, an opening degree control signal for the second flow rate control valve 320, to avoid cooling failure.

Thus, it may be possible to achieve an enhancement in user comfort.

FIG. 8 illustrates a flow of refrigerant generated during air stream heating and hot water operation in the heat pump according to the embodiment of FIG. 7.

Each of the plural indoor units closes the expansion valve thereof when neither cooling nor heating is carried out, and opens the expansion valve when any one of cooling and heating operations is carried out.

The following description will be given, assuming that all the plural indoor units perform heating operation.

The operation position of the 4-way valve 120 is changed to cause the high-pressure refrigerant discharged from the compressor 110 to be directly supplied to the second heat exchangers 210-1, 210-2 and 210-3 of the indoor units 200-1, 200-2 and 200-3. At the same time, the outdoor fan 140 is driven.

That is, the refrigerant discharged from the compressor 110 is fed to the second heat exchangers 210-1, 210-2 and 210-3 of the indoor units 200-1, 200-2 and 200-3 via the 4-way valve 120 and third electromagnetic valve 173. The refrigerant exchanges heat with indoor air blown to the second heat exchangers 210-1, 210-2 and 210-3 in accordance with rotation of indoor fans 220-1, 220-2 and 220-3 while passing through the second heat exchangers 210-1, 210-2 and 210-3. In accordance with rotation of indoor fans 220-1, 220-2 and 220-3, heated air is blown to indoor spaces ROOM1, ROOM2 and ROOM3, thereby heating the indoor spaces ROOM1, ROOM2 and ROOM3.

The refrigerant, which is condensed as it exchanges heat with indoor air, is pressure-reduced while passing through the first flow rate control valve 150. The refrigerant then exchanges heat with outdoor air while passing through the first heat exchanger 130 of the outdoor unit 100. The heat-exchanged refrigerant is then returned to the compressor 110.

During heat exchange at the first heat exchanger 130, cooled air is forcibly blown to the outdoors in accordance with rotation of the outdoor fan 140.

A portion of the refrigerant discharged from the compressor 110 is fed to the third heat exchanger 310 of the hydro unit 300, which performs a condenser function, via the first electromagnetic valve 171. Thereafter, the refrigerant from the third heat exchanger 310 is fed to the first heat exchanger 130 via the second flow rate control valve 320 and the first flow rate control valve 150 of the outdoor unit 100. The refrigerant is then fed to the accumulator 160 via the 4-way valve 120 after performing heat exchange at the first heat exchanger 130. In the accumulator 160, a liquid component of the refrigerant is separated from the refrigerant. The liquid-free refrigerant is again fed to the compressor 110.

While passing through the third heat exchanger 310 of the hydro unit 300, the refrigerant exchanges heat with water flowing around the third heat exchanger 310. As a result, hot water is generated in the hydro unit 300.

Figure 9A:
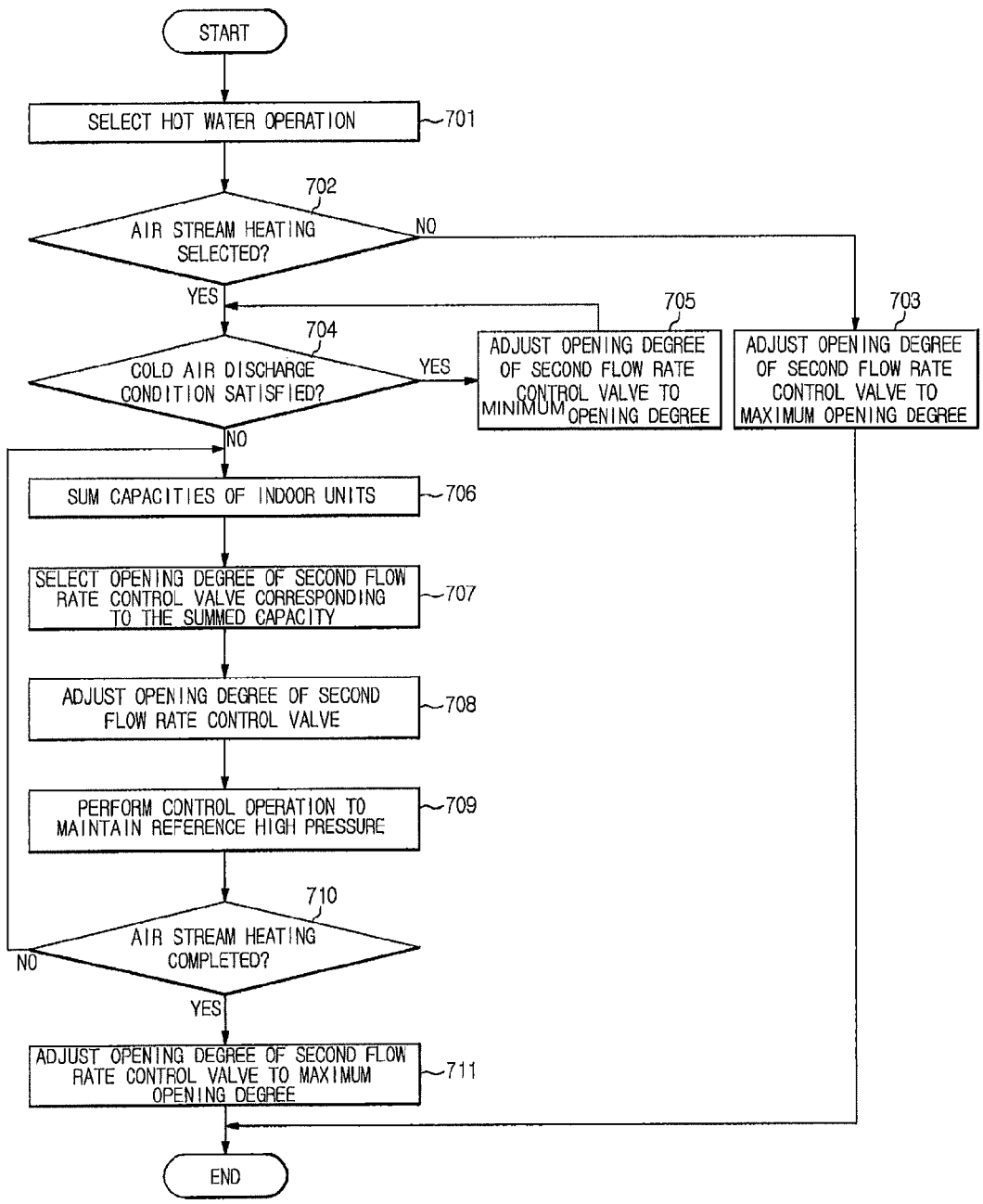
FIGS. 9A and 9B are flowcharts illustrating a control operation for air stream heating and hot water operation in the heat pump of FIG. 7 according to another embodiment of the present disclosure.

FIG. 9A is a flowchart illustrating a control operation for air stream heating and hot water operation in the heat pump of FIG. 7 according to another embodiment.

When water heating is selected by the user (701), the heat pump determines whether air stream heating is selected (702). That is, it is determined whether air stream heating and water heating are to be simultaneously carried out.

When it is determined that air stream heating has not been selected under the condition that water heating has been selected, the heat pump controls the second flow control valve 320 of the hydro unit 300 such that the opening degree of the second flow control valve 320 is maximized (703), to maximize the flow rate of refrigerant through the second flow rate control valve 320.

In air stream heating and hot water operation, the plural indoor units and hydro unit perform a condenser function. Here, non-selection of air stream heating operation means that all indoor units are in an OFF state or are in a temporarily stopped state because the temperatures of all of the corresponding indoor spaces are not lower than a target temperature. In this case, only the hydro unit performs a condenser function.

That is, the opening degree of the second flow rate control valve 320 of the hydro unit 300 is adjusted to a maximum opening degree, to generate a large amount of heat of condensation, and thus to generate hot water of high temperature.

On the other hand, when it is determined that air stream heating has been selected under the condition that water heating has been selected, the heat pump determines whether a cold air discharge condition to discharge cold air through the indoor units 200-1, 200-2 and 200-3 is satisfied (704).

The cold air discharge condition includes at least one of a condition in which the pressure of the high pressure section of the outdoor unit 100 is lower than a predetermined high pressure and a condition in which the temperature of discharge water of the hydro unit 300 is lower than a predetermined temperature.

When it is determined that the cold air discharge condition of the indoor units 200-1, 200-2 and 200-3 is satisfied, the heat pump controls the second flow rate control valve 320 of the hydro unit 300 such that the opening degree of the second flow rate control valve 320 is minimized to prevent cold air from being discharged through the indoor units 200-1, 200-2 and 200-3 at an initial stage of the air stream heating operation (705). In accordance with this control, the pressure of the high pressure section of the outdoor unit 100 becomes equal to or higher than the predetermined high temperature.

Accordingly, it may be possible to reduce user discomfort caused by cold air at the initial stage of the air stream heating operation.

On the other hand, when it is determined that the cold air discharge condition of the indoor units 200-1, 200-2 and 200-3 is not satisfied, the heat pump determines that discharge of hot air will begin from the initial stage of the air stream heating operation, and then controls the heating operations of the indoor units 200-1, 200-2 and 200-3 while adjusting the opening degree of the second flow rate control valve 320 of the hydro unit 300, based on the capacities of the indoor units 200-1, 200-2 and 200-3.

This will be described in more detail.

First, the heat pump identifies predetermined capacities of the indoor units 200-1, 200-2 and 200-3 and a predetermined capacity of the hydro unit 300.

The heat pump then sums the capacities of the indoor units 200-1, 200-2 and 200-3 and the capacity of the hydro unit 300 (706), and calculates the capacity of the outdoor unit 100 corresponding to the summed capacity. The heat pump then controls driving of the outdoor unit 100, based on the calculated capacity.

The total capacity of the indoor units 200-1, 200-2 and 200-3 corresponds to the total capacity of the condenser, whereas the capacity of the outdoor unit 100 corresponds to the capacity of the evaporator. Based on these capacities, it may be possible to set the operation factor of the compressor.

In addition, the heat pump may compare a target temperature of each of the indoor units 200-1, 200-2 and 200-3 with an indoor temperature to calculate an air temperature difference. Taking into consideration the air temperature difference, the heat pump may compensate the predetermined capacity of the corresponding one of the indoor units 200-1, 200-2 and 200-3. Thereafter, the heat pump may sum the compensated capacities of the indoor units 200-1, 200-2 and 200-3.

The heat pump may also compare the temperatures of discharge water and introduced water of the hydro unit 300 with each other to calculate a water temperature difference. Taking into consideration the water temperature difference, the heat pump may compensate the predetermined capacity of the hydro unit 300. The heat pump may then sum the compensated capacity of the hydro unit 300 and the total capacity of the indoor units 200-1, 200-2 and 200-3.

The heat pump then selects an opening degree of the second flow rate control valve 320 of the hydro unit 300 corresponding to the total capacity of the indoor units 200-1, 200-2 and 200-3 (707).

Here, the opening degree of the second flow rate control valve 320 corresponding to the total capacity of the indoor units 200-1, 200-2 and 200-3 is previously stored. This will be described with reference to FIG. 9B.

Figure 9B:
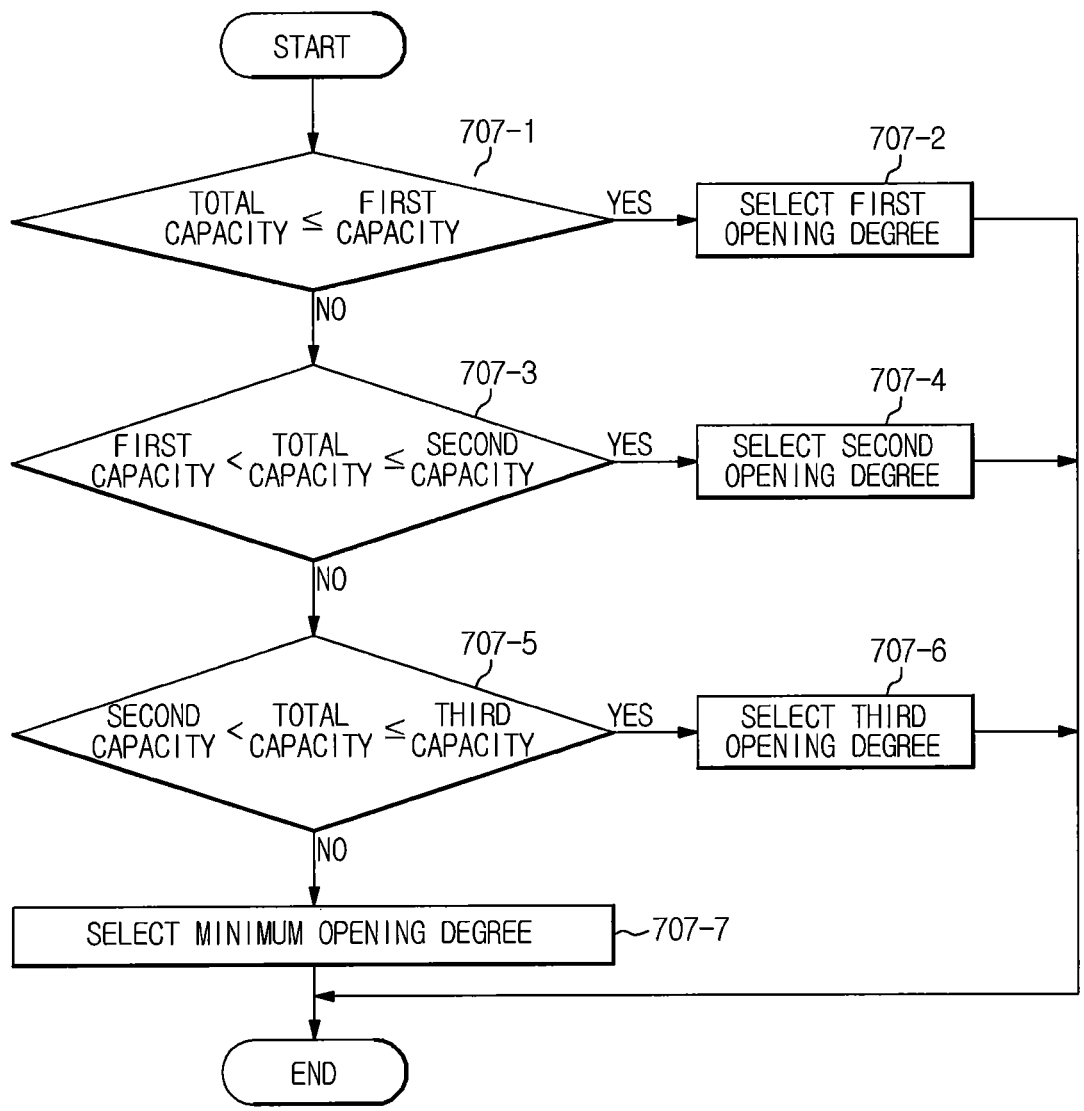

As shown in FIG. 9B, once the total capacity of the indoor units 200-1, 200-2 and 200-3 is calculated, the calculated total capacity is compared with a first capacity (707-1). When it is determined, based on the result of comparison, that the total capacity is equal to or less than the first capacity, a first opening degree is selected as the opening degree of the second flow rate control valve 320 (707-2).

On the other hand, when it is determined, based on the result of comparison, that the total capacity exceeds the first capacity, the calculated total capacity is compared with a second capacity (707-3). When it is determined, based on the result of comparison, that the total capacity exceeds the first capacity, but is equal to or less than the second capacity, a second opening degree is selected as the opening degree of the second flow rate control valve 320 (707-4). When it is determined, based on the result of comparison, that the total capacity exceeds the second capacity, the calculated total capacity is compared with a third capacity (707-5).

When the total capacity exceeds the second capacity, but is equal to or less than the third capacity, a third opening degree is selected as the opening degree of the second flow rate control valve 320 (707-6). On the other hand, when the total capacity exceeds the third capacity, a minimum opening degree is selected as the opening degree of the second flow rate control valve 320 (707-7).

Here, the first, second, and third capacities are previously stored. The first capacity is greater than 0, the second capacity is greater than the first capacity, and the third capacity is greater than the second capacity (0<First Capacity<Second Capacity<Third Capacity<100).

The first opening degree is less than the maximum opening degree, but is greater than the second opening degree. The second opening degree is greater than the third opening degree. The third opening degree is greater than the minimum opening degree (Maximum Opening Degree>First Opening Degree>Second Opening Degree>Third Opening Degree>Minimum Opening Degree).

That is, when the total capacity of the indoor units 200-1, 200-2 and 200-3 is great, the opening degree of the second flow rate control valve 320 is reduced to supply an increased amount of refrigerant to the second heat exchangers 210-1, 210-2 and 210-3 of the indoor units 200-1, 200-2 and 200-3. On the other hand, when the total capacity of the indoor units 200-1, 200-2 and 200-3 is small, the opening degree of the second flow rate control valve 320 is increased to supply a reduced amount of refrigerant to the second heat exchangers 210-1, 210-2 and 210-3 of the indoor units 200-1, 200-2 and 200-3.

In addition, it may be possible to compensate the predetermined opening degrees for the second flow rate control valve 310 in accordance with outdoor temperature. In this case, it may also be possible to previously store the predetermined opening degrees for the second flow rate control valve 310 compensated in accordance with outdoor temperature.

As the first, second and third opening degrees for the second flow control valve 320 of the hydro unit 300 are compensated in accordance with outdoor temperature, it may be possible to solve a sensible heat problem caused by lowered outdoor temperature.

Thereafter, the heat pump adjusts the opening degree of the second flow rate control valve 320 of the hydro unit 300 (708). Subsequently, the heat pump performs a control operation to maintain the high pressure of the high pressure section of the outdoor unit 100 at a reference high pressure by finely increasing or reducing the adjusted opening degree of the second flow rate control valve 320 (709).

Thus, the heat pump may perform heat recovery and time division multiplexing (TDM) operations through a hybrid (ATA & ATW) operation in accordance with the capacities of the indoor units. Accordingly, it may be possible to satisfy the capacities of the indoor units and to achieve comfort heating operation.

The heat pump then determines whether air stream heating has been completed (710). When it is determined that air stream heating has been completed, the heat pump maximizes the opening degree of the second flow rate control valve 320 of the hydro unit 300 (711).

At this time, the heat pump performs only the hot water operation. That is, the hydro unit 300 performs a condenser function. In accordance with generation of heat of condensation, hot water is generated in the hydro unit 300.

The generated hot water may be used as wash water when a valve provided at the hot water pipe line is opened. Also, the generated hot water may be supplied to the floor pipe line when a valve provided at the floor pipe line is opened, so that the hot water is used for radiant heating.

The air stream heating is completed when the time, for which the target temperature is maintained in accordance with the air stream heating, exceeds a predetermined time or when all indoor units are turned off by the user.

When it is determined that air stream heating is still carried out, the heat pump again calculates the total capacity of the indoor units 200-1, 200-2 and 200-3, and then adjusts the opening degree of the second flow rate control valve 320 such that the opening degree corresponds to the calculated capacity. Subsequently, the heat pump finely adjusts the adjusted opening degree of the second flow rate control valve 320 so that the high pressure section of the outdoor unit 100 is maintained at the reference high pressure.

Figure 10:
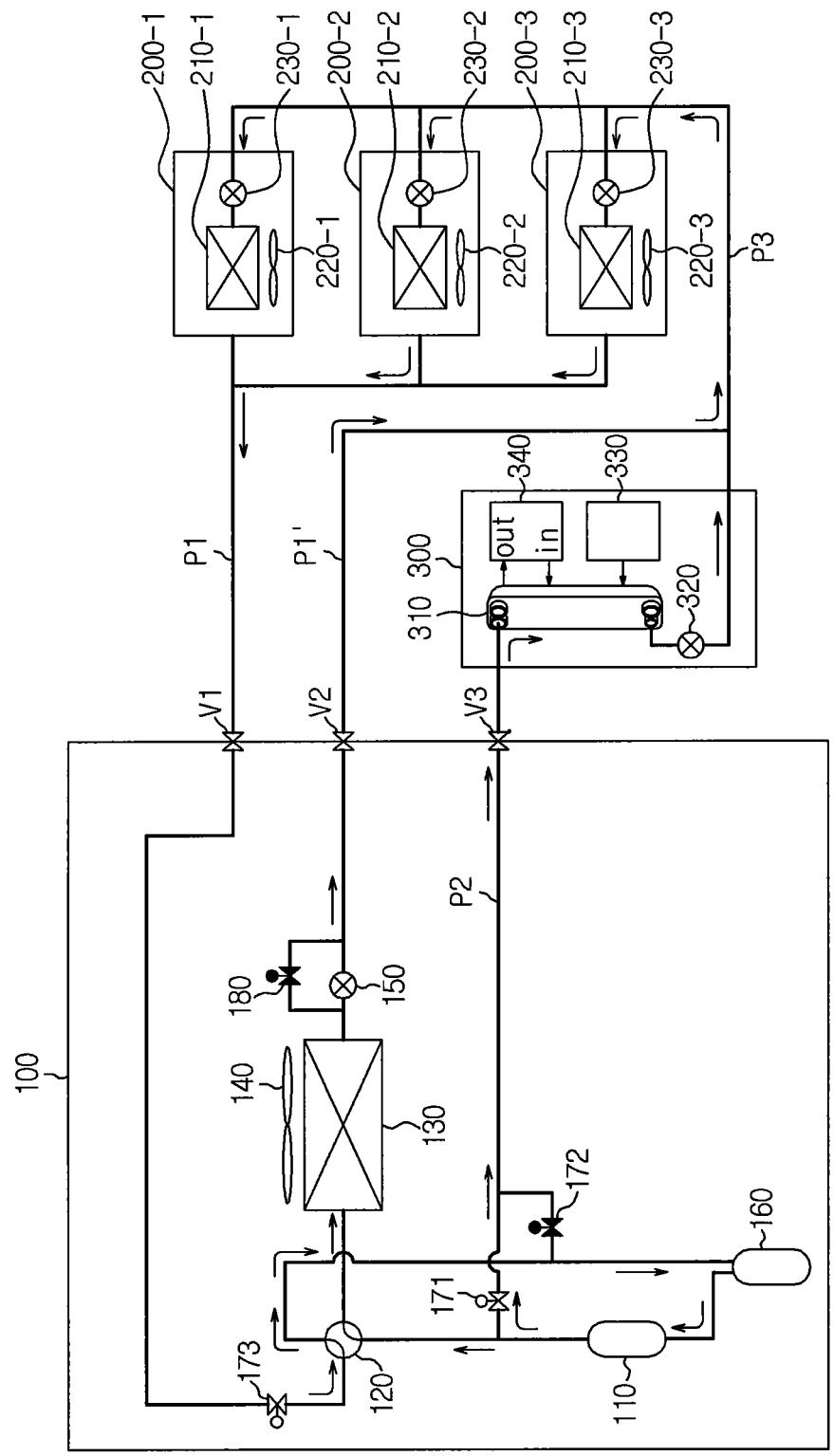
FIG. 10 is a view illustrating a flow of refrigerant generated during air stream cooling and hot water operation in the heat pump according to the embodiment of FIG. 7.

FIG. 10 is a view illustrating a flow of refrigerant generated during air stream cooling and hot water operation in the heat pump according to the embodiment of FIG. 7.

In this case, the operation position of the 4-way valve 120 is changed to cause the high-pressure refrigerant discharged from the compressor 110 to be directly supplied to the first heat exchanger 100 of the outdoor unit 100. At the same time, the outdoor fan 140 is driven.

That is, the refrigerant discharged from the compressor 110 is fed to the first heat exchanger 130 of the outdoor unit 100, which performs a condenser function, via the 4-way valve 120.

The refrigerant exchanges heat with outdoor air blown to the first heat exchanger 130 in accordance with rotation of the outdoor fan 140 while passing through the first heat exchanger 130. In this case, air heated through heat exchange is blown to the outdoors.

The refrigerant, which is condensed in the first heat exchanger 130 of the outdoor unit 100, is pressure-reduced while passing through the expansion valves 230-1, 230-2 and 230-3 of the indoor units 200-1, 200-2 and 200-3. The refrigerant then exchanges heat with indoor air blown to the second heat exchangers 210-1, 210-2 and 210-3 while passing through the second heat exchangers 210-1, 210-2 and 210-3 of the indoor units 200-1, 200-2 and 200-3. In accordance with rotation of indoor fans 220-1, 220-2 and 220-3, cold air is blown to indoor spaces.

The heat-absorbed refrigerant is fed to the compressor 110 via the third electromagnetic valve 173, 4-way valve 120, and accumulator 160.

A portion of the refrigerant discharged from the compressor 110 is fed to the third heat exchanger 310 of the hydro unit 300, which performs a condenser function, via the first electromagnetic valve 171. Thereafter, the refrigerant from the third heat exchanger 310 is fed to the second heat exchangers 210-1, 210-2 and 210-3 via the second flow rate control valve 320 and the expansion valves 230-1, 230-2 and 230-3 of the indoor units 200-1, 200-2 and 200-3.

The refrigerant exchanges heat with water in the hydro unit 300 while passing through the third heat exchanger 310 of the hydro unit 300. As a result, hot water is generated in the hydro unit 300.

Figure 11A:
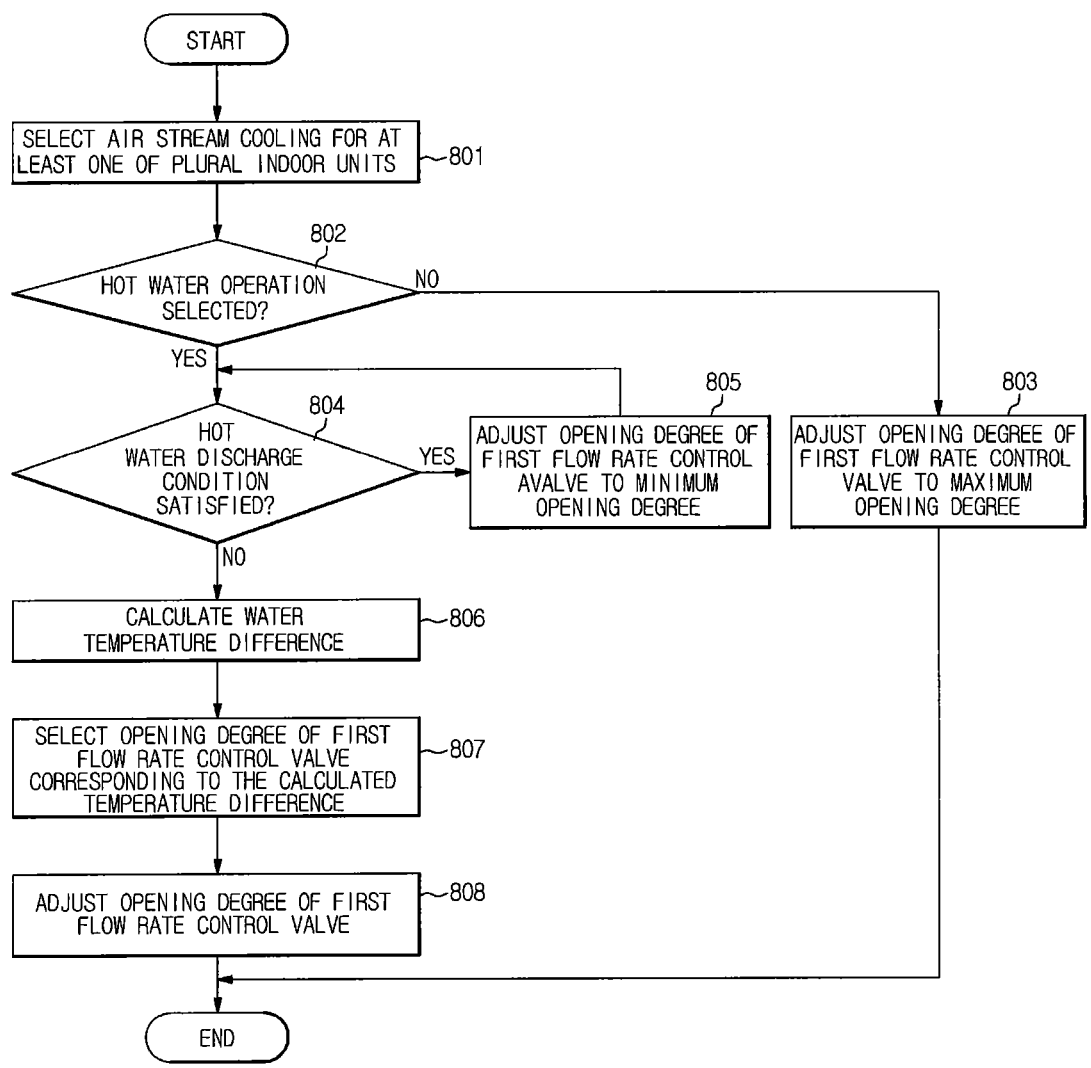
FIGS. 11A and 11B are flowcharts illustrating a control operation for air stream cooling and hot water operation in the heat pump of FIG. 7 according to another embodiment of the present disclosure.

FIG. 11A is a flowchart illustrating a control operation for air stream cooling and hot water operation in the heat pump of FIG. 7 according to another embodiment.

When air stream cooling is selected for at least one of the plural indoor units 200-1, 200-2 and 200-3 by the user (801), the heat pump determines whether a hot water operation has also been selected (802). That is, the heat pump determines whether the air stream cooling is selected along with the hot water operation.

When it is determined that the hot water operation has not been selected under the condition that the air stream cooling has been selected, the heat pump controls the first flow rate control valve 150, to maximize the opening degree of the first flow rate control valve 150 (803), thereby maximizing the flow rate of the refrigerant through the first flow rate control valve 150.

In this case, since only the outdoor unit 100 performs a condenser function, the opening degree of the first flow rate control valve 150 of the outdoor unit 100 is adjusted to a maximum opening degree to supply a maximum amount of refrigerant to the outdoor unit 100 so that the outdoor unit 100 operates with a capacity corresponding to the total capacity of the indoor units 200-1, 200-2 and 200-3.

When it is determined that the hot water operation has been selected under the condition that the air stream cooling has been selected, the heat pump determines whether hot water discharged through the hydro unit 300 satisfies a hot water discharge condition to discharge hot water having a temperature lower than a predetermined reference temperature (804).

Here, the hot water discharge condition to discharge hot water lower than the predetermined reference temperature includes at least one of a condition in which the pressure of the high pressure section of the outdoor unit 100 is lower than a predetermined high pressure and a condition in which the temperature of water discharged through the hydro unit 300 is lower than the second predetermined temperature.

When it is determined that hot water discharged through the hydro unit 300 satisfies the hot water discharge condition to discharge hot water having a temperature lower than a predetermined reference temperature, the heat pump controls the first flow rate control valve 150 of the outdoor unit 100, to minimize the opening degree of the first flow rate control valve 150 (805) such that the pressure of the high pressure section of the outdoor unit 100 is equal to or higher than the predetermined high pressure, and thus to supply a large amount of high-temperature and high-pressure refrigerant to the hydro unit 300 at an early stage of the hot water operation. Accordingly, water within the hydro unit 300 is rapidly heated.

The minimum opening degree is an opening degree allowing refrigerant to flow slowly without pooling.

When it is determined that hot water discharged through the hydro unit 300 does not satisfy the hot water discharge condition to discharge hot water having a temperature lower than the predetermined reference temperature, the heat pump determines that hot water having a temperature not lower than the predetermined reference temperature will be discharged from the early stage of the hot water operation. Based on this determination, the heat pump controls a hot water operation of the hydro unit 300.

During air stream cooling and hot water operation, the outdoor unit 100 and hydro unit 300, which perform a condenser function, may operate while sharing the capacity of condensation operation because only the indoor units 200-1, 200-2 and 200-3 perform an evaporator function, and the outdoor unit 100 and hydro unit 300 simultaneously perform a condenser function.

That is, for generation of hot water using waste heat, the second flow rate control valve 320 of the hydro unit 300 is opened to a maximum opening degree. Under this condition, air stream cooling and hot water operation are controlled through adjustment of the opening degree of the first flow rate control valve 150 in the outdoor unit 100 in accordance with the load (temperature difference) of the hydro unit 300.

The heat pump closes the fourth electromagnetic valve 180 of the outdoor unit 100, to cut off refrigerant flowing through the fourth electromagnetic valve 180. Thus, the heat pump controls distribution of refrigerant to the hydro unit 300 and the first heat exchanger 130 of the outdoor unit 100.

The control operation for air stream cooling and hot water operation through adjustment of the opening degree of the first flow rate control valve 150 in the outdoor unit 100 will be described in more detail.

The heat pump detects the temperature of water in the hydro unit 300, and compares the detected water temperature with a predetermined water temperature, to calculate a difference between the two temperatures (806). Here, the temperature of water in the hydro unit 300 includes the temperature of at least one of water introduced into the hydro unit 300 and water discharged from the hydro unit 300.

In more detail, the heat pump detects the temperatures of the introduced water and discharge water of the hydro unit 300. The heat pump then calculates the difference between the detected introduced water temperature and a predetermined introduced water temperature or the temperature between the detected discharge water temperature and a predetermined discharge water temperature.

Thereafter, the heat pump selects an opening degree of the first flow rate control valve 150 of the outdoor unit 100 corresponding to the calculated temperature difference (807). Here, values representing opening degrees of the first flow rate control valve 150 corresponding to various temperature differences are previously stored.

Figure 11B:
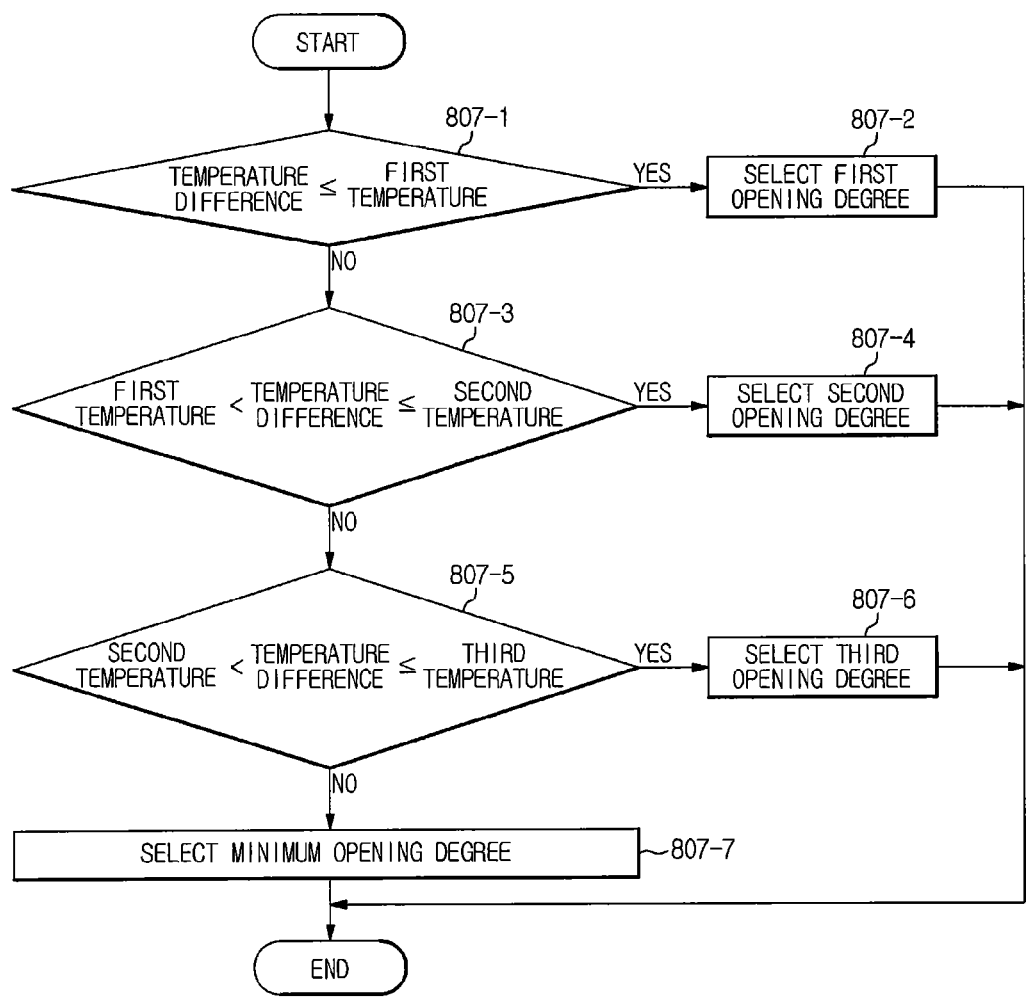

In detail, once the temperature difference is calculated, the calculated temperature difference is compared with a first temperature (807-1), as shown in FIG. 11B. When it is determined, based on the result of comparison, that the calculated temperature difference is equal to or less than the first temperature, a first opening degree is selected as the opening degree of the first flow rate control valve 150 (807-2).

On the other hand, when the temperature difference exceeds the first temperature, the temperature difference is compared with a second temperature (807-3). When it is determined, based on the result of comparison, that the temperature difference exceeds the first temperature, but is equal to or less than the second temperature, a second opening degree is selected as the opening degree of the first flow rate control valve 150 (807-4). When it is determined, based on the result of comparison, that the temperature difference exceeds the second temperature, the temperature difference is compared with a third temperature (807-5).

When the temperature difference exceeds the second temperature, but is equal to or less than the third temperature, a third opening degree is selected as the opening degree of the first flow rate control valve 150 (807-6). On the other hand, when the temperature difference exceeds the third temperature, a minimum opening degree is selected as the opening degree of the first flow rate control valve 150 (807-7).

Here, the first, second, and third temperatures are previously stored. The first temperature is less than the second temperature, the second temperature is less than the third temperature (First Temperature<Second Temperature<Third Temperature).

The first opening degree is less than the maximum opening degree, but is greater than the second opening degree. The second opening degree is greater than the third opening degree. The third opening degree is greater than the minimum opening degree (Maximum Opening Degree>First Opening Degree>Second Opening Degree>Third Opening Degree>Minimum Opening Degree).

Thereafter, the heat pump adjusts the opening degree of the first flow rate control valve 150 of the outdoor unit 100 such that the adjusted opening degree corresponds to the selected opening degree (808).

Thus, the amount of refrigerant supplied to the hydro unit 300 is adjusted. Accordingly, it may be possible to adjust heat of condensation generated from the hydro unit 300.

That is, for an increased temperature difference, the opening degree of the first flow rate control valve 150 is reduced in order to allow an increased amount of refrigerant to be supplied to the third heat exchanger 310 of the hydro unit 300. On the other hand, for a reduced temperature difference, the opening degree of the first flow rate control valve 150 is increased in order to allow a reduced amount of refrigerant to be supplied to the third heat exchanger 310 of the hydro unit 300. As the amount of refrigerant supplied to the hydro unit 300 is adjusted as described above, generation of heat of condensation from the third heat exchanger 310 of the hydro unit 300 is adjusted.

Hot water generated in the above-described mode may be used for wash water as the valve provided at the hot water pipe line is opened.

Subsequently, the heat pump finely adjusts the adjusted opening degree of the first flow rate control valve 150 of the outdoor unit 100 while performing an air stream cooling operation so that the low pressure section of the outdoor unit 100 is maintained at the reference low pressure.

Thus, it may be possible to achieve an enhancement in user comfort, using the single outdoor unit.

In order to avoid inefficiency of sensible cool and heat, the heat pump is controlled to satisfy air stream cooling and heating loads. Also, supply of hot water using an additional heat source is also possible. Thus, it may be possible to achieve comfort cooling and heating and supply of hot water, using reduced installation costs and reduced operation costs.

Figure 12:
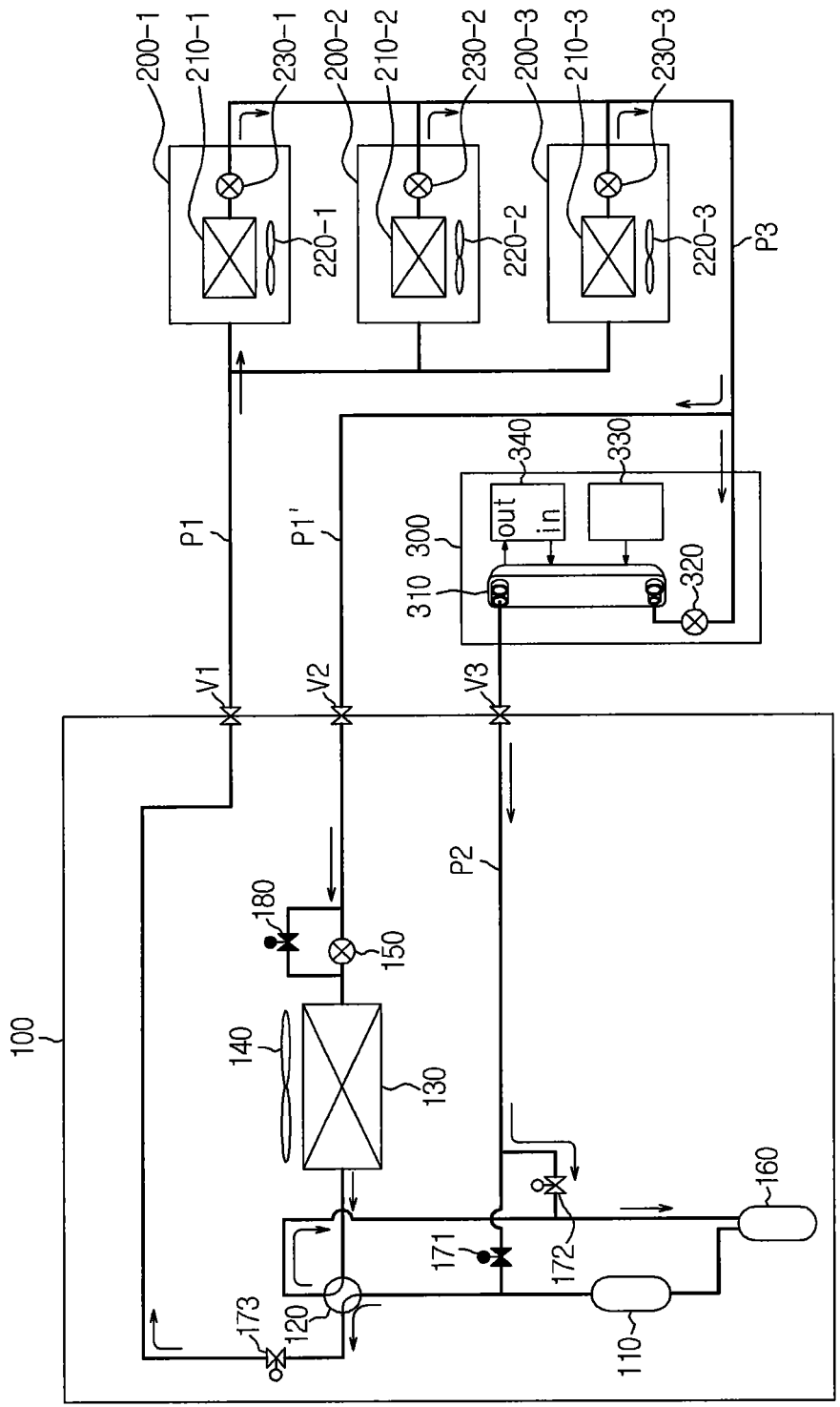
FIGS. 12 to 15 are flowcharts each illustrating a control operation for air stream heating and cold water operation in the heat pump of FIG. 7 according to another embodiment of the present disclosure.

FIG. 12 is a flowchart illustrating a control operation for air stream heating and cold water operation in the heat pump of FIG. 7 according to another embodiment.

The following description will be given, assuming that the plural indoor units simultaneously perform heating operation.

In this case, the operation position of the 4-way valve 120 is changed to cause the high-pressure refrigerant discharged from the compressor 110 to be supplied to the second heat exchangers 230-1, 230-2 and 230-3 of the plural indoor units 200-1, 200-2 and 200-3. At the same time, the outdoor fan 140 is driven.

That is, the refrigerant discharged from the compressor 110 is fed to the second heat exchangers 230-1, 230-2 and 230-3 of the plural indoor units 200-1, 200-2 and 200-3 via the 4-way valve 120 and third electromagnetic valve 173. The refrigerant exchanges heat with air blown to the second heat exchangers 210-1, 210-2 and 210-3 in accordance with rotation of indoor fans 220-1, 220-2 and 220-3 while passing through the second heat exchangers 210-1, 210-2 and 210-3.

In accordance with rotation of indoor fans 220-1, 220-2 and 220-3, heated air is blown to indoor spaces ROOM1, ROOM2 and ROOM3, thereby heating the indoor spaces ROOM1, ROOM2 and ROOM3.

A portion of the refrigerant, which is condensed as it exchanges heat with indoor air, is pressure-reduced while passing through the first flow rate control valve 150. The refrigerant then exchanges heat with outdoor air while passing through the first heat exchanger 130 of the outdoor unit 100. The heat-exchanged refrigerant is then returned to the compressor 110 via the 4-way valve 120.

During heat exchange at the first heat exchanger 130, cooled air is forcibly blown to the outdoors in accordance with rotation of the outdoor fan 140.

The remaining portion of the refrigerant, which is condensed as it exchanges heat with indoor air, is pressure-reduced while passing through the second flow rate control valve 320 of the hydro unit 300. The refrigerant exchanges heat with water flowing around the third heat exchanger 310 of the hydro unit 300 while passing through the third heat exchanger 310. The resultant refrigerant is returned to the compressor 110 via the second electromagnetic valve 172 and accumulator 160.

The refrigerant exchanges heat with water in the hydro unit 300 performing an evaporator function, while passing through the third heat exchanger 310 of the hydro unit 300. As a result, cold water is generated in the hydro unit 300.

In this case, the plural indoor units 200-1, 200-2 and 200-3 perform a condenser function, whereas the hydro unit 300 performs an evaporator function.

In this case, the fourth electromagnetic valve 180 is closed to control distribution of refrigerant, taking into consideration loads of air stream heating and generation of cold water. Also, the opening degree of the first flow rate control valve 150 is controlled to control overheating of the outdoor unit 100. In addition, the opening degree of the second flow rate control valve 320 is controlled to control overheating of the hydro unit 300.

In this case, inlet and outlet temperatures of the first heat exchanger 130 are detected, and a difference between the detected inlet and outlet temperatures is calculated. Based on the calculated temperature difference, the opening degree of the first flow rate control valve 150 is controlled to correspond to the calculated temperature difference. The opening degree of the first flow rate control valve 150 corresponding to the difference between the inlet and outlet temperatures of the first heat exchanger 130 is previously stored.

Also, inlet and outlet temperatures of the third heat exchanger 310 are detected, and a difference between the detected inlet and outlet temperatures is calculated. Based on the calculated temperature difference, the opening degree of the second flow rate control valve 320 is controlled to correspond to the calculated temperature difference. The opening degree of the second flow rate control valve 320 corresponding to the difference between the inlet and outlet temperatures of the third heat exchanger 310 is previously stored.

Thus, it may be possible to prevent liquid refrigerant from entering the compressor even when an abrupt variation in indoor load occurs.

Figure 13:
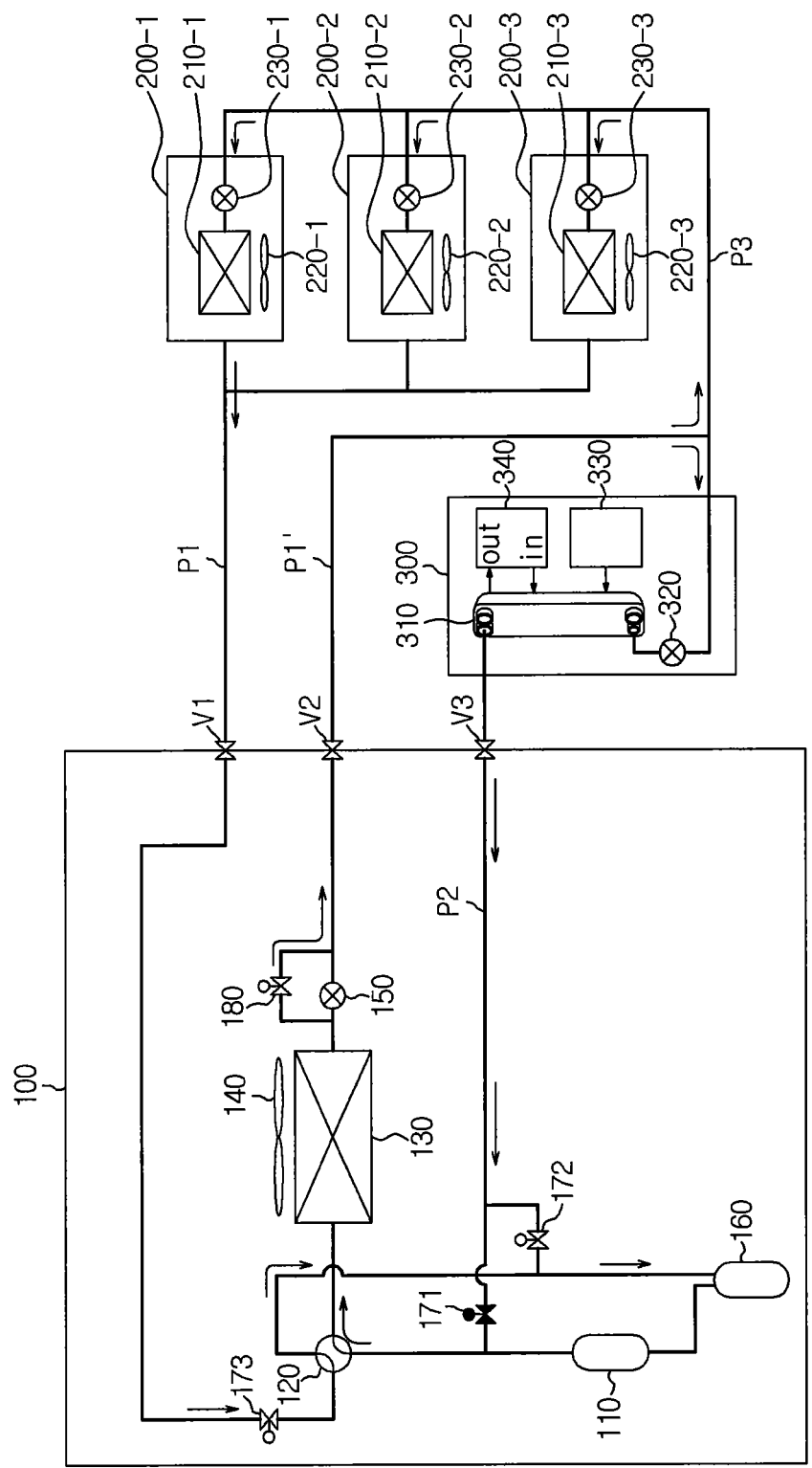

FIG. 13 is a flowchart illustrating a control operation for air stream cooling and cold water operation in the heat pump of FIG. 7 according to another embodiment.

In this case, the operation position of the 4-way valve 120 is changed to cause the high-pressure refrigerant discharged from the compressor 110 to be directly supplied to the first heat exchanger 130 of the outdoor unit 100. At the same time, the outdoor fan 140 is driven.

That is, the high-temperature and high-pressure refrigerant discharged from the compressor 110 is fed to the first heat exchanger 130 of the outdoor unit 100 performing a condenser function, via the 4-way valve 120.

The refrigerant exchanges heat with outdoor air blown to the first exchanger 130 in accordance with rotation of the outdoor fan 140 while passing through the first exchanger 130. Thus, hot air is discharged to the outdoors.

The refrigerant, which is condensed in the first heat exchanger 130 of the outdoor unit 100, is pressure-reduced while passing through the expansion valves 230-1, 230-2 and 230-3 of the plural indoor units 200-1, 200-2 and 200-3 via the fourth electromagnetic valve 180.

When the fourth electromagnetic valve 180 is not installed, it may be possible to supply refrigerant to the indoor units via the first flow rate control valve 150. In this case, the first flow rate control valve 150 does not perform an expansion function in order to reduce or eliminate flow resistance.

The second heat exchangers 230-1, 230-2 and 230-3 of the indoor units 200-1, 200-2 and 200-3 performing an evaporator function exchange heat with indoor air. As a result, cold air is blown to the indoor spaces in accordance with rotation of the indoor fans 220-1, 220-2, and 220-3.

The heat-absorbed refrigerant is fed to the compressor 110 via the third electromagnetic valve 173, 4-way valve 120, and accumulator 160.

A portion of the refrigerant, which is condensed in the first heat exchanger 130 of the outdoor unit 100, is pressure-reduced while passing through the second flow rate control valve 320 of the hydro unit 300. The refrigerant then exchanges heat with water flowing around the third heat exchanger 310 of the hydro unit 300 while passing through the third heat exchanger 310. The resultant refrigerant is returned to the compressor 110 via the second electromagnetic valve 172 and accumulator 160.

The refrigerant exchanges heat with water in the hydro unit 300 performing an evaporator function, while passing through the third heat exchanger 310 of the hydro unit 300. As a result, cold water is generated in the hydro unit 300.

In this case, the plural indoor units 200-1, 200-2 and 200-3 and hydro unit 300 perform an evaporator function, whereas the outdoor unit 100 performs a condenser function. In this case, the operation capacity of the outdoor unit 100 may exceed a maximum capacity because the hydro unit 300 and the plural indoor units 200-1, 200-2 and 200-3 operate using the single outdoor unit 100.

As a result, inefficient sensitive cool may be generated during the air stream cooling operation. In order to avoid such a phenomenon, the pressure of the low pressure section of the outdoor unit 100 is detected, and the detected pressure is compared with a predetermined low pressure. When the detected pressure is equal to or higher than the predetermined low pressure, the second flow rate control valve 320 of the hydro unit 300 is closed to stop supply of cold water.

On the other hand, when the pressure of the low pressure section of the outdoor unit is lower than the predetermined low pressure, overheating is controlled to operate the outdoor unit 100 in accordance with the capacity of the air stream cooling operation, and thus to eliminate problems associated with sensitive cool.

Also, when the opening degrees of the expansion valves 230-1, 230-2 and 230-3 of the indoor units 200-1, 200-2 and 200-3 are equal to or higher than the predetermined low pressure, and overheating of the indoor units 200-1, 200-2 and 200-3 is equal to or higher than a predetermined value, the second flow rate control valve 320 of the hydro unit 300 is closed to stop supply of cold water.

Figure 14:
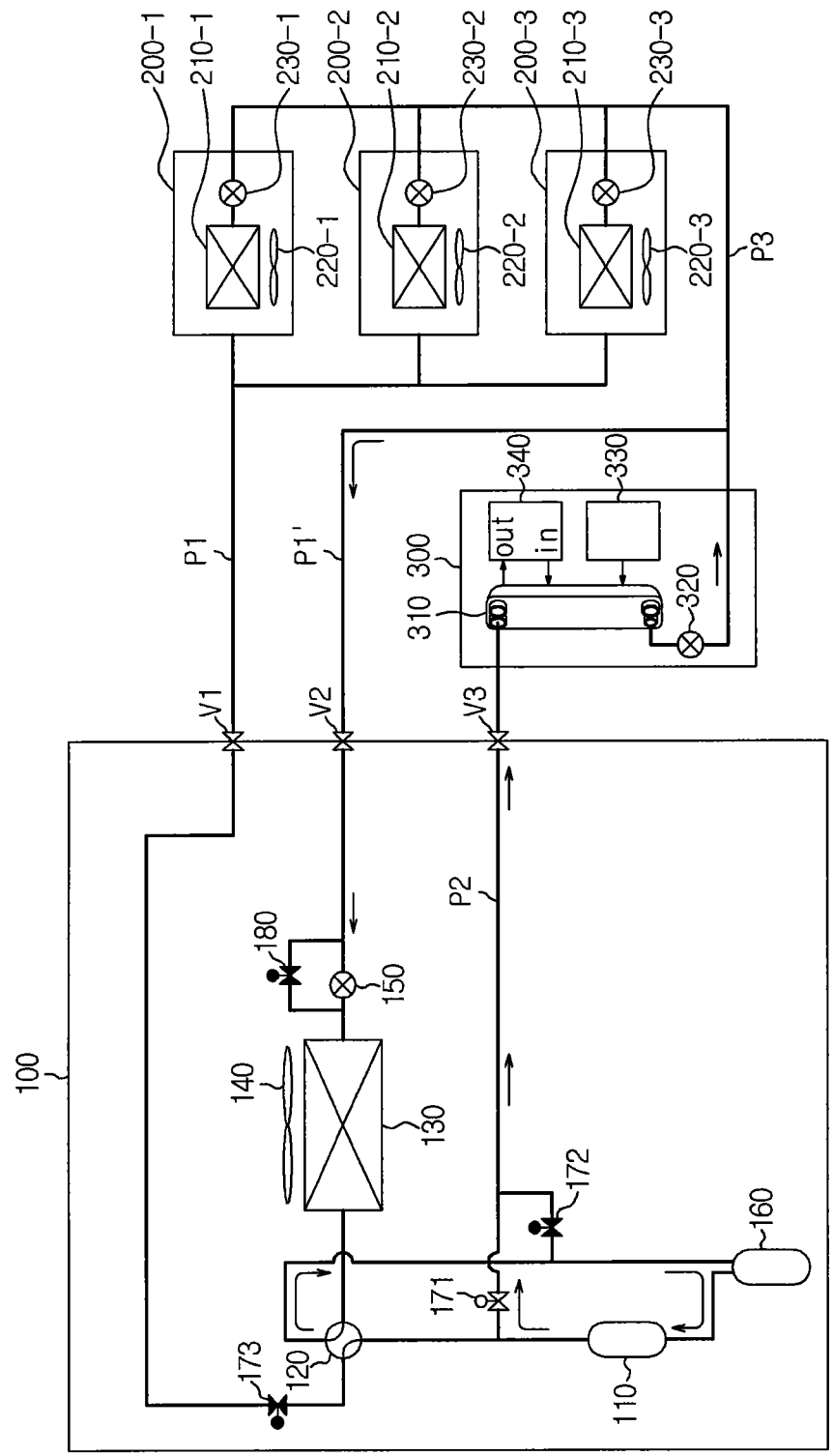

FIG. 14 is a flowchart illustrating a control operation for hot water operation in the heat pump of FIG. 7 according to another embodiment.

In this case, air stream cooling and air stream heating are not carried out. That is, the expansion valves 230-1, 230-2 and 230-3 of the plural indoor units 200-1, 200-2 and 200-3 are closed, and the third electromagnetic valve 173 is closed. Also, the second electromagnetic valve 172 is closed to stop cold water operation.

The refrigerant discharged in accordance with driving of the compressor 110 is fed, via the first electromagnetic valve 171, to the third heat exchanger 310 of the hydro unit 300, which performs a condenser function. The refrigerant from the third heat exchanger 310 is fed to the first heat exchanger 130 via the second flow rate control valve 320 and the first flow rate control valve 150 of the outdoor unit 100. After performing heat exchange in the first heat exchanger 130, the refrigerant is fed to the accumulator 160 via the 4-way valve 120. In the accumulator 160, a liquid component of the refrigerant is separated from the refrigerant. The liquid-free refrigerant is again fed to the compressor 110.

While passing through the third heat exchanger 310 of the hydro unit 300, the refrigerant exchanges heat with water flowing around the third heat exchanger 310. As a result, hot water is generated in the hydro unit 300.

Figure 15:
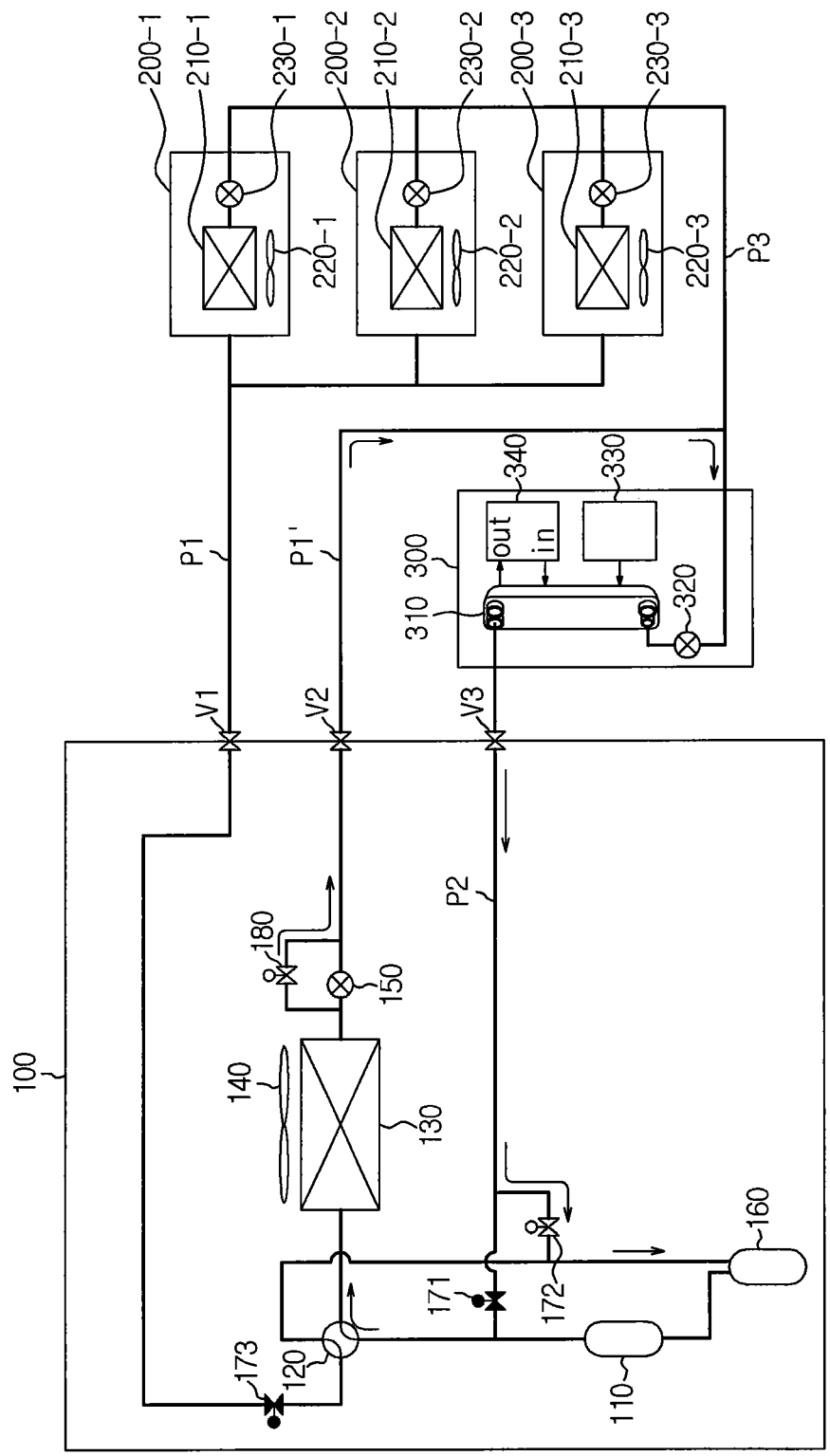

FIG. 15 is a flowchart illustrating a control operation for cold water operation in the heat pump of FIG. 7 according to another embodiment.

In this case, air stream cooling and air stream heating are not carried out. That is, the expansion valves 230-1, 230-2 and 230-3 of the plural indoor units 200-1, 200-2 and 200-3 are closed, and the third electromagnetic valve 173 is closed. Also, the first electromagnetic valve 171 is closed to stop hot water operation.

The refrigerant discharged in accordance with driving of the compressor 110 performs heat exchange in the first heat exchanger 130 of the outdoor unit 100. The heat-exchanged refrigerant is fed to the second flow control valve 320 of the hydro unit 300 via the fourth electromagnetic valve 180. In this case, the first flow rate control valve 150 of the outdoor unit 100 is closed.

When the fourth electromagnetic valve 180 is not installed, it may be possible to supply refrigerant to the indoor units via the first flow rate control valve 150. In this case, the first flow rate control valve 150 does not perform an expansion function in order to reduce or eliminate flow resistance.

The refrigerant is pressure-reduced while passing through the second flow rate control valve 320 of the hydro unit 300. The refrigerant then exchanges heat with water flowing around the third heat exchanger 310 of the hydro unit 300 while passing through the third heat exchanger 310. The resultant refrigerant is returned to the compressor 110 via the second electromagnetic valve 172 and accumulator 160.

As the refrigerant exchanges heat with water flowing around the third heat exchanger 310 of the hydro unit 300, which performs an evaporator function, while passing through the third heat exchanger 310, cold water is generated in the hydro unit 300.

Also, when the heat pump according to the embodiment of FIG. 7 performs only the air stream cooling or heating operation (ATA operation), the first and second electromagnetic valves 171 and 172 are closed, whereas only the third electromagnetic valve 173 is opened. In this case, the second flow rate control valve 320 of the hydro unit 300 is closed.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A method for controlling a heat pump including an outdoor unit including a compressor and a first heat exchanger, an indoor unit including a second heat exchanger and an expansion valve to perform air stream cooling and heating operations, and a hydro unit connected among the compressor, the first heat exchanger, and the expansion valve, to change a flow direction of refrigerant in accordance with cold water and hot water operations, the method comprising:

determining by a controller whether the hot water operation and the air stream heating operation are simultaneously selected;

controlling, by the controller, an adjusting of an opening degree of a valve included in the hydro unit when the hot water operation and the air stream heating operation are determined by the controller to be simultaneously selected, to adjust amounts of refrigerant respectively supplied from the compressor to the hydro unit and the indoor unit;

wherein controlling, by the controller, the adjusting of the opening degree of the valve included in the hydro unit comprises:

identifying by the controller a capacity of the indoor unit;

selecting by the controller an opening degree of the valve such that the selected opening degree corresponds to the identified capacity of the indoor unit;

compensating, by the controller, the selected opening degree, based on a detected outdoor temperature; and, controlling, by the controller, the adjusting of the opening degree of the valve such that the adjusted opening degree corresponds to the compensated opening degree.

2. The method according to claim 1, further comprising:

identifying by the controller a target temperature of the indoor unit;

calculating by the controller a difference between the detected indoor temperature and the target temperature; and compensating by the controller the capacity of the indoor unit, based on the calculated temperature difference.

3. The method according to claim 2, wherein controlling of the adjusting of the opening degree of the valve included in the hydro unit comprises:

reducing the opening degree of the valve for a higher capacity of the indoor unit.

4. The method according to claim 1, further comprising:

determining by the controller whether a cold air discharge condition to discharge cold air through the indoor unit is satisfied; and controlling, by the controller, an adjusting of the opening degree of the valve such that the adjusted opening degree corresponds to a minimum opening degree when the cold air discharge condition is satisfied.

5. The method according to claim 4, wherein the determining whether the cold air discharge condition is satisfied comprises:

determining by the controller that the cold air discharge condition is satisfied, when the detected pressure of a high pressure section of the outdoor unit is lower than a predetermined high temperature.

6. The method according to claim 4, wherein the determining whether the cold air discharge condition is satisfied comprises:

determining by the controller that the cold air discharge condition is satisfied, when a detected temperature of the discharge water is lower than a predetermined temperature.

7. The method according to claim 1, further comprising:

controlling, by the controller, an adjusting of the opening degree of the valve included in the hydro unit such that the adjusted opening degree corresponds to a maximum opening degree, when the controller determines that only the hot water operation is selected, to cut off the supply of refrigerant to the indoor unit.

8. The method according to claim 1, further comprising:

determining by the controller whether the air stream cooling operation and the cold water operation are simultaneously selected; and controlling, by the controller, an adjusting of the opening degree of the valve included in the hydro unit when the air stream cooling operation and the cold water operation are determined by the controller to be simultaneously selected, to control a low pressure of an inlet side of the compressor.

9. The method according to claim 8, further comprising:

opening a first electromagnetic valve provided between an outlet side of the compressor and the hydro unit when the hot water operation is selected;

opening a second electromagnetic valve provided between the inlet side of the compressor and the hydro unit when the cold water operation is selected; and opening a third electromagnetic valve provided between the compressor and the indoor unit when one of the air stream cooling and heating operations is selected.

10. The method according to claim 1, further comprising:

controlling a valve included in the outdoor unit when the hot water operation and the air stream heating operation are simultaneously selected, to lower a pressure of refrigerant supplied to the first heat exchanger.

11. The method according to claim 1, further comprising:

determining, by the controller, whether the hot water operation and the air stream heating operation are simultaneously selected; and controlling, by the controller, an adjusting of an opening degree of a valve included in the outdoor unit when the hot water operation and the air stream heating operation are simultaneously selected, to adjust amounts of refrigerant respectively supplied from the indoor unit to the hydro unit and the first heat exchanger of the outdoor unit.

* * * * *